(12) United States Patent
Slutsker et al.

(10) Patent No.: US 11,677,700 B1
(45) Date of Patent: Jun. 13, 2023

(54) SYSTEMS AND METHODS FOR OPT-IN MESSAGING

(71) Applicant: META PLATFORMS, INC., Menlo Park, CA (US)

(72) Inventors: Igor Slutsker, Santa Clara, CA (US); Rohit Watve, Santa Clara, CA (US); Yi Xiao, Sunnyvale, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 61 days.

(21) Appl. No.: 16/886,998

(22) Filed: May 29, 2020

(51) Int. Cl.
| | |
|---|---|
| *G06F 15/16* | (2006.01) |
| *H04L 51/18* | (2022.01) |
| *G06Q 10/10* | (2023.01) |
| *G06Q 50/00* | (2012.01) |
| *H04L 9/32* | (2006.01) |
| *G06Q 30/016* | (2023.01) |
| *H04L 51/224* | (2022.01) |
| *G06F 16/22* | (2019.01) |

(52) U.S. Cl.
CPC ............ *H04L 51/18* (2013.01); *G06Q 10/10* (2013.01); *G06Q 30/016* (2013.01); *G06Q 50/01* (2013.01); *H04L 9/3213* (2013.01); *H04L 51/224* (2022.05); *G06F 16/22* (2019.01)

(58) Field of Classification Search
CPC ....... H04L 51/18; H04L 9/3213; H04L 51/24; G06Q 10/10; G06Q 30/016; G06Q 50/01; G06F 16/22
USPC ....................................................... 709/206
See application file for complete search history.

(56) References Cited

U.S. PATENT DOCUMENTS

| | | | | |
|---|---|---|---|---|
| 8,607,271 | B2* | 12/2013 | Seppala ................. | H04H 60/72 725/39 |
| 2008/0141026 | A1* | 6/2008 | Cordery ................ | H04L 9/3263 713/156 |
| 2009/0164313 | A1* | 6/2009 | Jones .................. | G06Q 30/0255 705/14.53 |
| 2012/0036360 | A1* | 2/2012 | Bassu ................... | H04L 9/3234 713/168 |
| 2013/0109348 | A1* | 5/2013 | Sharma ................. | H04W 12/06 455/411 |
| 2013/0218595 | A1* | 8/2013 | Burkett ................. | G06Q 30/02 705/2 |
| 2016/0142390 | A1* | 5/2016 | Draegen ................ | H04L 63/08 726/9 |
| 2019/0372770 | A1* | 12/2019 | Xu ..................... | G06Q 30/0258 |

* cited by examiner

*Primary Examiner* — Imad Hussain
(74) *Attorney, Agent, or Firm* — Fenwick & West LLP

(57) ABSTRACT

Exemplary embodiments relate to techniques for allowing a first user of a messaging platform to send follow-up message(s) to a second user after expiration of an allotted messaging time period without violating existing messaging policies based at least in part on opt-in messaging. The first user may perform an API call to an API of a messaging server to send a follow-up message request. Based on the request, the messaging server may send an opt-in message to the second user who may then explicitly opt in to receive a follow-up message from the first user. A qualifying response by the second user to the opt-in message may cause the messaging server to generate a unique token for the communicating pair. The first user may send the follow-up message to the second user by sending the message with the token.

20 Claims, 16 Drawing Sheets

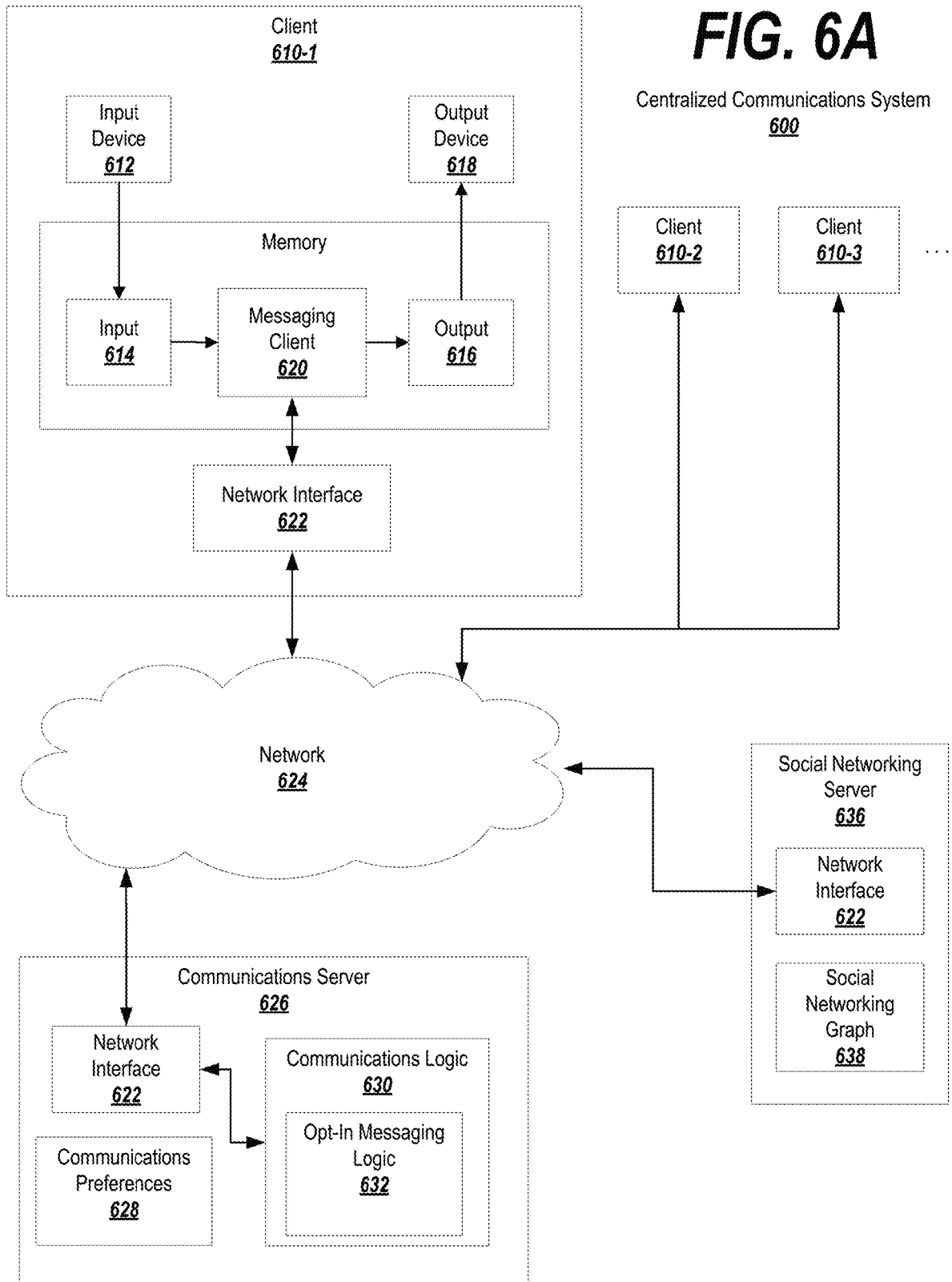

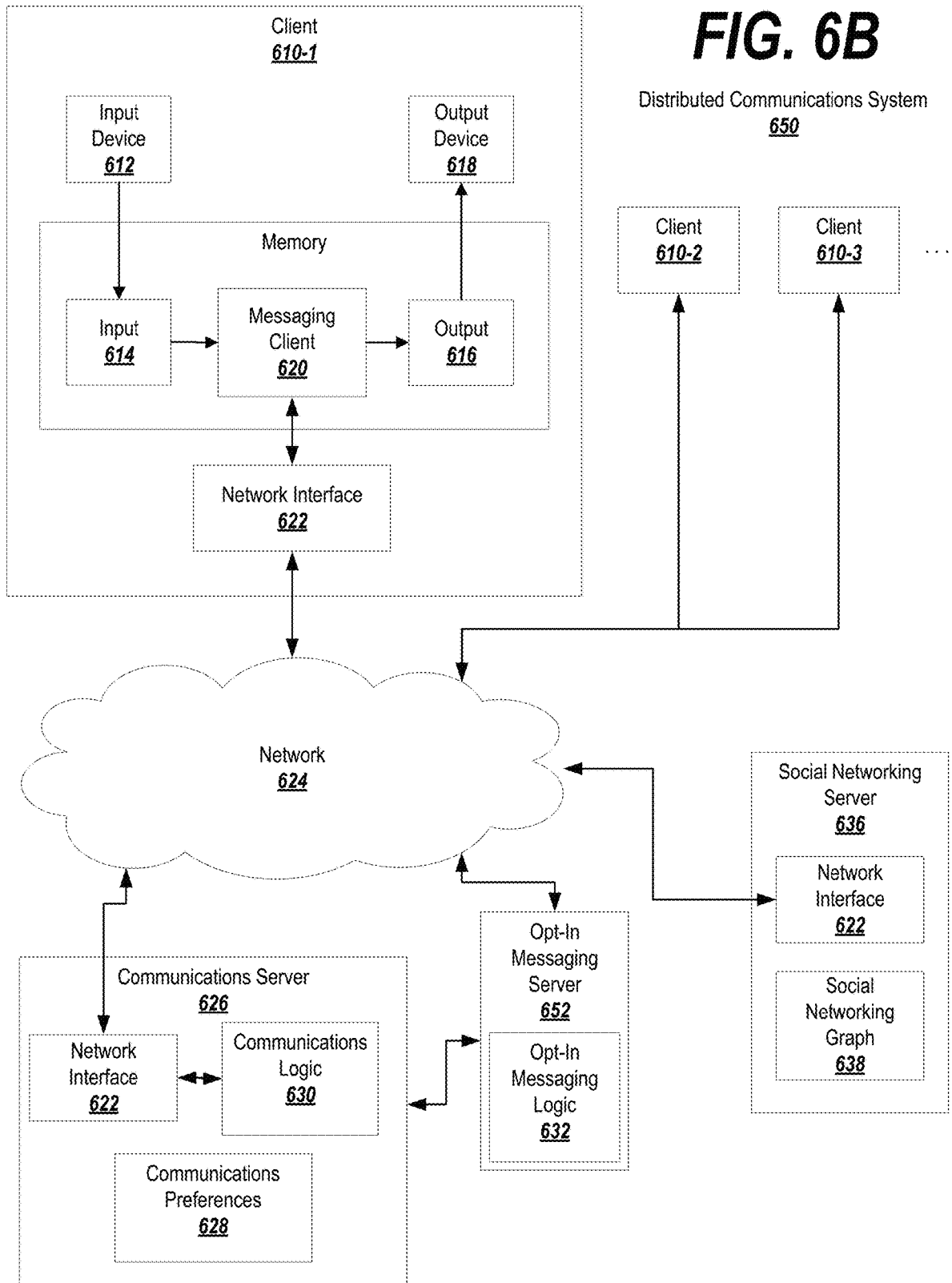

SYSTEMS AND METHODS FOR OPT-IN MESSAGING

BACKGROUND

Users may employ messaging platforms to send other users various types of messages. To prevent or mitigate users from sending certain types of messages, some messaging platforms may implement strict messaging policies. For instance, a user may be allotted a predefined period of time to send another user the certain types of messages. After this predefined time period expires, the user may be restricted from sending the other user any more of the certain types of messages until the other user communicatively reengages the user. There may be certain situations, however, where it is mutually beneficial for the user to send, and the other user to receive, a follow-up message or notification of the certain type outside the allotted messaging window.

BRIEF DESCRIPTION OF THE DRAWINGS

FIG. 6A is a block diagram providing an overview of a system including an exemplary centralized communications service.

FIG. 6B is a block diagram providing an overview of a system including an exemplary distributed communications service.

DETAILED DESCRIPTION

Figure 1:
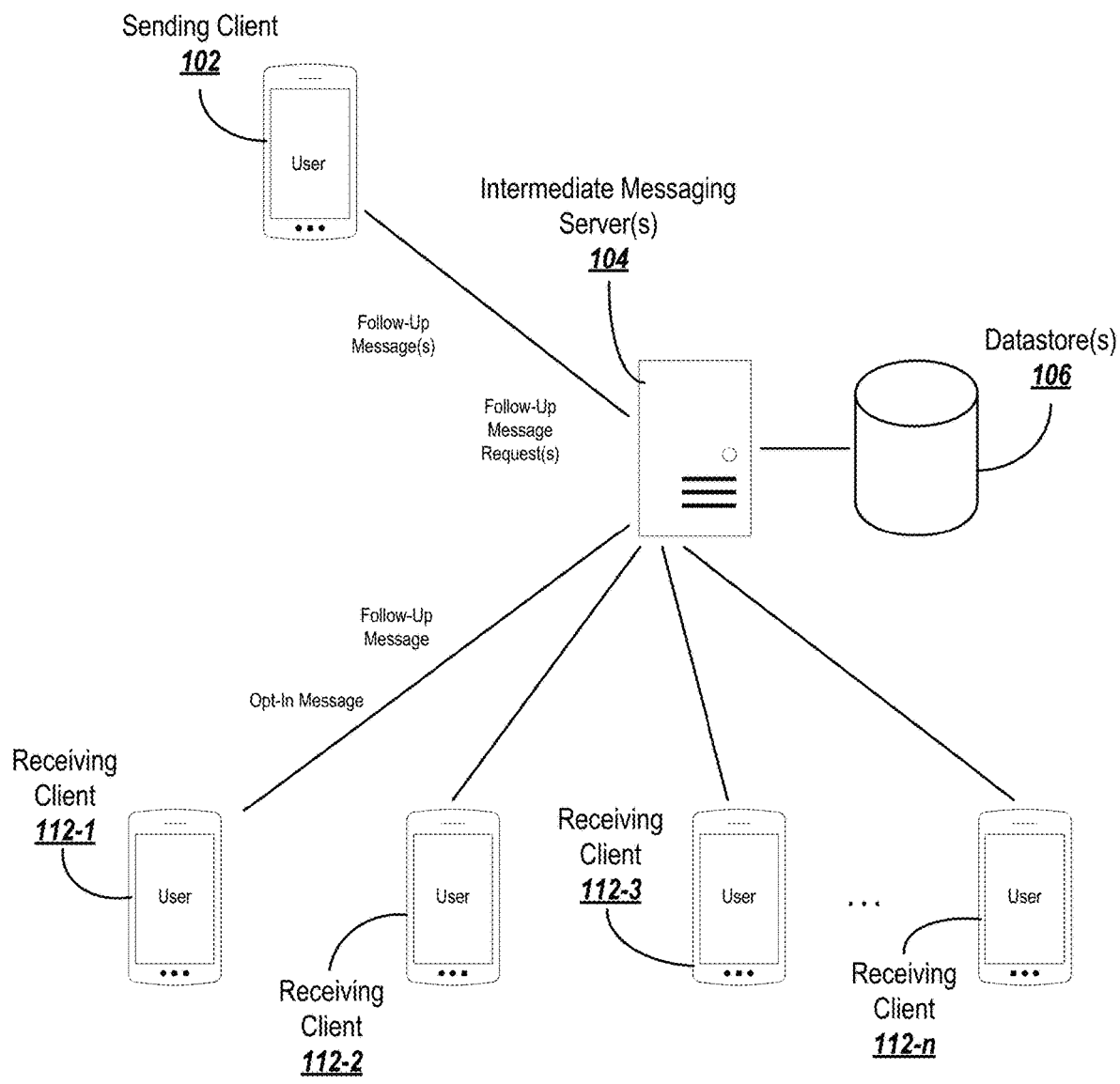
FIG. 1 depicts an exemplary system for initiating a follow-up message request.

Exemplary embodiments techniques for enabling a first user on a messaging platform to send a second user at least one follow-up message or notification outside an allotted messaging period (e.g., 24 hours) without violating any existing messaging policies. According to exemplary embodiments, the first user may send a follow-up message request to an application programming interface (API) of a messaging server. Assuming the request is granted by the messaging server, the second user may receive an opt-in message inquiring whether the second user would like to receive a follow-up notification regarding a particular topic. The second user may then explicitly opt-in by replying "opt-in" or "notify me" in a messaging interface, or in other instances, the second user may simply select an "opt-in" icon provided in the opt-in message. If the second user does not interact with the opt-in request message within a certain time period, then the messaging server may interpret that to mean the second user is uninterested in opting in.

Once the second user has opted in, the messaging server may generate a unique token for the user pair. The token may be provided to the first user as part of a webhook notifying the first user that the second user has opted in. The first user may be required to use the generated token as the mechanism to send the second user the follow-up message. In some examples, the token may expire after a predefined period of time.

When the first user sends the follow-up message with the token, the messaging server may verify whether that token matches the token previously generated by the messaging server for the user pair. In some examples, the first user may also be required to apply a special "opt-in" tag along with the token to successfully send the follow-up message. Thereafter, a user pair token count (e.g., a set number of tokens that can be generated for the second user) may be decremented by a predefined value, e.g. one. Each user on the messaging platform may have a limited number of tokens it can use within a given time period.

In further exemplary embodiments, it may be possible for the first user to send the second user a one-time follow up message containing updates on different topics, e.g., allowing the user to view and interact with the multiple updates in a carousel display format. It may also be possible for the first user to send the second user multiple updates or notifications on the same follow-up topic. The number of such updates, however, may be limited by a predefined number. Moreover, in some examples, the opt-in and follow-up messaging functionalities described herein may be built into a separate plug-in application or software or in any other suitable manner.

The exemplary embodiments presented and described herein are advantageous in numerous ways. Opt-in messaging, for example, provides a mechanism for a user of a messaging platform to send follow-up message(s) or notification(s) to other users of the platform outside an allowed messaging window. Thus, an explicit opt-in allows a user to send a message that would otherwise be prohibited by anti-spamming or other related messaging policies on the messaging platform. These messages (e.g., follow-up messages or notifications pertaining or related to a particular topic) may be messages that users may want to receive in various messaging scenarios. Moreover, performing token-based verification for each user on the messaging platform ensures strict adherence of the existing messaging policies. Opt-in messaging may be different from subscription-based messaging in that an explicit opt in from a user receiving the follow-up message is required such that only information necessary to inform the receiving user of the occurrence of a follow-up event related to a particular topic of prior user interest is sent, whereas a subscription pushes out numerous messages at random unrelated times.

This brief summary is intended to serve as a non-limiting introduction to the concepts discussed in more detail below. However, before discussing further exemplary embodiments, a brief note on data privacy is first provided. A more detailed description of opt-in and follow-up messaging will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Exemplary System

FIG. 1 depicts an exemplary system 100 according to one or more exemplary embodiments. The system 100 may be part of or implemented in a messaging platform (e.g., social networking platform, social media platform, standalone messaging platform). The system 100 may include at least a sending client device 102, one or more intermediate messaging servers 104, one or more data stores 106 coupled to the messaging server(s) 104, and receiving client devices 112. The sending client device 102 and the receiving client devices 112 may communicate among each other via the messaging server(s) 104. The intermediate messaging server(s) 104 may run, support, or execute one or more APIs for facilitating the opt-in and follow-up messaging functionalities. A sending user (e.g., first user) may be associated with and operate the sending client device 102. Each of the receiving client devices 112 may be associated with or belong to different receiving users on the messaging platform (e.g., second user, third user, fourth user, fifth user).

As shown, the sending user may send a follow-up message request to the intermediate messaging server 104 (via an API call) so that a follow-up message or notification can be sent to a particular receiving client device 112 after an allotted messaging period (e.g., 24 hours) has expired.

According to exemplary embodiments, the follow-up message request may be in the form of a template. The template may have a structure that is preconfigured and may be structured in a manner that does not allow much customizability by the sending user. For instance, a body of the request may correspond to a standard format for all template types, and further, the template may not include any images or URLs. Thus, in some instances, the sending user may be allowed to customize only a title and payload of the follow-up message request. To further limit customizability of the request, the title field or the payload may be character limited.

Once the follow-up message request is received by the intermediate messaging server, the template of the request may be rendered or processed to generate an opt-in message for the receiving client device based on the title and payload content provided in the request. An opt-in message may allow the receiving user to explicitly opt in to receive a follow-up message from the sending user about a topic that was of previous interest to the receiving user.

The opt-in message may include an icon that the receiving user can select, or in other examples, the receiving user may reply "opt-in," "notify me," or in any other suitable manner using a messaging interface. When a qualifying response to the opt-in message is received from the receiving user, a web callback, webhook, HTTP push API, etc. may be delivered to the sending user indicating at least that the receiving user has opted in and desires to receive the follow-up message or notification.

As will be further described in detail below, when the sending user is ready to send the follow-up message or notification, it can send the follow-up message along with a unique token (e.g., provisioned by the messaging server 104 specifically for the receiving client device 112) to the messaging server 104. The messaging server 104 may then verify that the token sent by the sending user with the follow-up message matches the token generated by the server, and based on successful verification, the messaging server 104 may then send the follow-up message to the receiving client device 112.

Different follow-up messages may be sent to different receiving client devices at different times by the sending client device, where each instance may require a separate follow-up message request sent by the sending user to the messaging server 104 and a separate opt-in message sent by the server 104 to each user of the respective receiving client device.

In some instances, a sending user may be required to obtain permission from the messaging platform before the page can request or send follow-up messages. The sending user may be required to agree to certain terms and may be granted permission only if the user agrees to those terms and meets one or more criteria (e.g., the sending user has not previously violated any messaging policies). In some cases, the permission may be automatically granted if the sending user does not have a prior history of follow-up communication with users.

Exemplary Opt-In and Follow-Up Messaging

As described above, there may be messaging scenarios where it may be mutually beneficial for a first user to send, and a second user to receive, a follow-up message or notification related to a particular topic outside the allotted messaging window.

In one example, a business page on a messaging platform (e.g., clothing business) may want to send, and a user (e.g., potential customer, existing customer, contact) may want to receive, a follow-up message or notification on a particular clothing item when the item has been stocked or restocked. In another example, a business page (e.g., ticketing business) may want to send, and a user (e.g., frequent concert goer) may want to receive, a follow-up message or notification regarding the future availability of concert tickets for a particular artist that the user may have previously inquired about. In yet another example, a business page (e.g., an electronics business) may want to send, and a user (e.g., potential customer) may want to receive, a follow-up notification regarding a price drop on a specific electronic device that the user previously expressed interested in purchasing. In a further example, a business page (e.g., financial business) may send, and a user (e.g., trader) may want to receive, a follow-up message regarding a price increase or decrease of a particular stock. Other examples may include sending follow-up messages in the context of common carrier services (e.g., flights, train rides, bus rides), retail, other services, etc.

It may be understood that terms such as "promotion," "promotion content," "promotion item," "promotion event," or the like, as used herein, may broadly refer to any type of marketing communication used to inform or persuade a target audience of a product, service, brand, or issue. Moreover, the term "business page," as used herein, may broadly refer to a virtual representation of a business on the messaging platform and used by the business to generally showcase the business and increase overall brand awareness. In examples, the business page itself may be the messaging entity that communicates with users on the messaging platform.

Figure 2A:
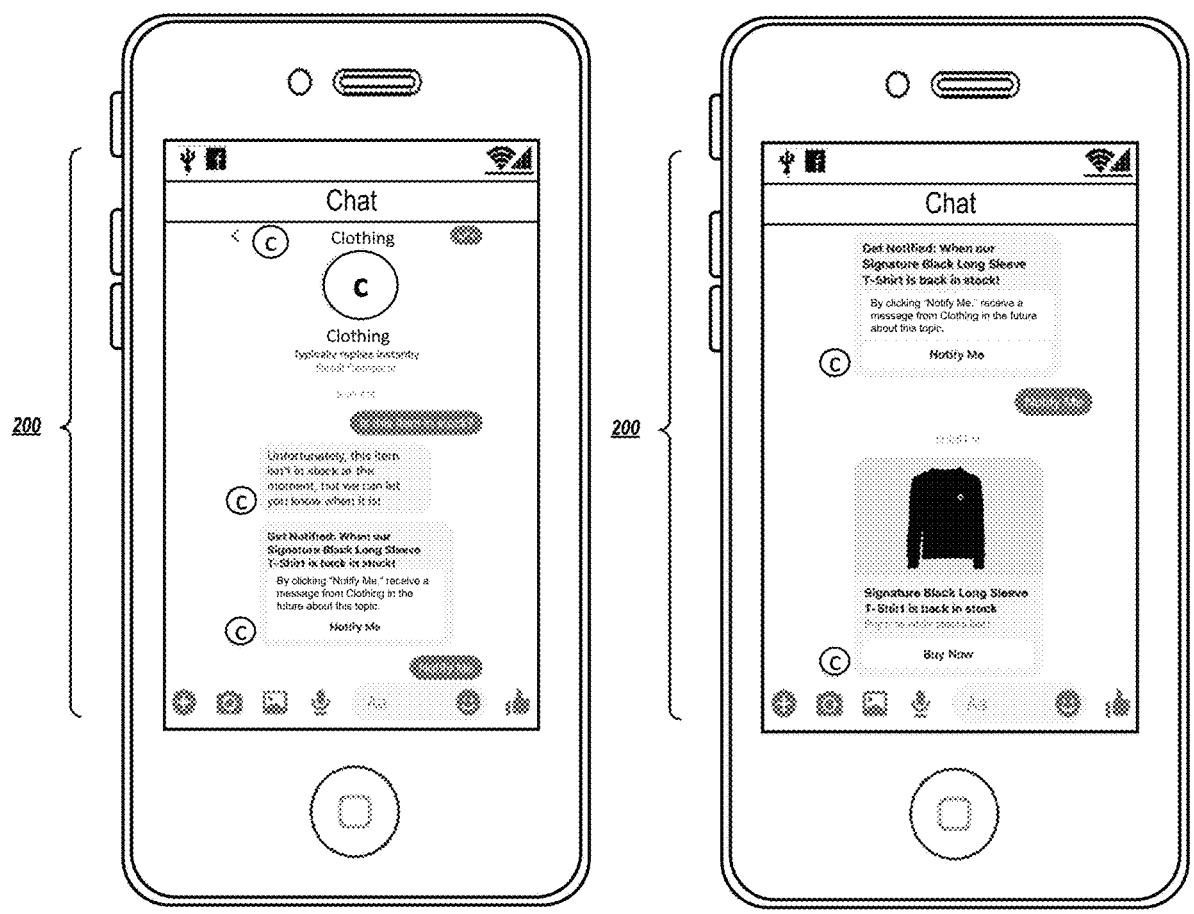
FIG. 2A depicts a first exemplary interface for opt-in and follow-up messaging.

FIG. 2A depicts an exemplary messaging interface 200 for opt-in and follow-up messaging according to one or more exemplary embodiments. A user may initiate conversation with a clothing business page (called "Clothing") using the messaging interface 200. When the user first opens messaging interface 200 to communicate with the business page, various types of information related to Clothing may be presented to the user under Clothing's messaging profile, such as how long it typically takes for the page to respond to messages, the type of company (e.g., retail), etc.

As shown, the user may ask the clothing business page if a particular item is in stock. The item may be referenced in the body of the user's message, by sending the page a digital image of the item, or made known to the page in other suitable ways. For example, the item that the user is interested in purchasing may be the signature black long sleeve shirt sold by Clothing. The page may respond "unfortunately this item isn't in stock at the moment, but we can let you know when it is!"

The signature black long sleeve shirt may be restocked in three days. The business page may want to follow up and notify the user once the shirts have been restocked. Thus, an opt-in message for receiving the follow-up notification from the clothing business page may be sent to the user. As illustrated, the opt-in message may recite "Get Notified: When our signature black long sleeve t-shirt is back in stock!" Moreover, the opt-in message may include a disclaimer, which states "By clicking 'notify me,' you may receive a message from Clothing in the future about this topic." The user may opt in to receive the follow-up message by selecting the "notify me" icon.

The user may respond to the opt-in message by pressing or selecting the "Notify Me" icon displayed on the opt-in message, or alternatively, the user may reply by typing and sending "notify me" or "opt in" on the messaging interface 200 or in any other suitable manner indicating an explicit desire to opt-in, such as "sure," "OK I'm in," etc. It may be understood that, in some examples, the response may be required to explicitly include certain trigger words, such as "notify me" or "opt-in," from the user.

Once the user has opted in, the user can receive a follow-up message or notification from the page when the signature black long sleeve shirt is in stock and available for purchase. As shown, the user may interact with the follow-up message by selecting the "Buy Now" icon to purchase the item.

To at least that end, the clothing business page may be able to send the user a follow-up message related to the signature shirt even after the 24-hour messaging window has closed without violating any existing anti-spamming or related messaging policies on the messaging platform, thus at last advantageously enhancing the page-user experience.

Figure 2B:
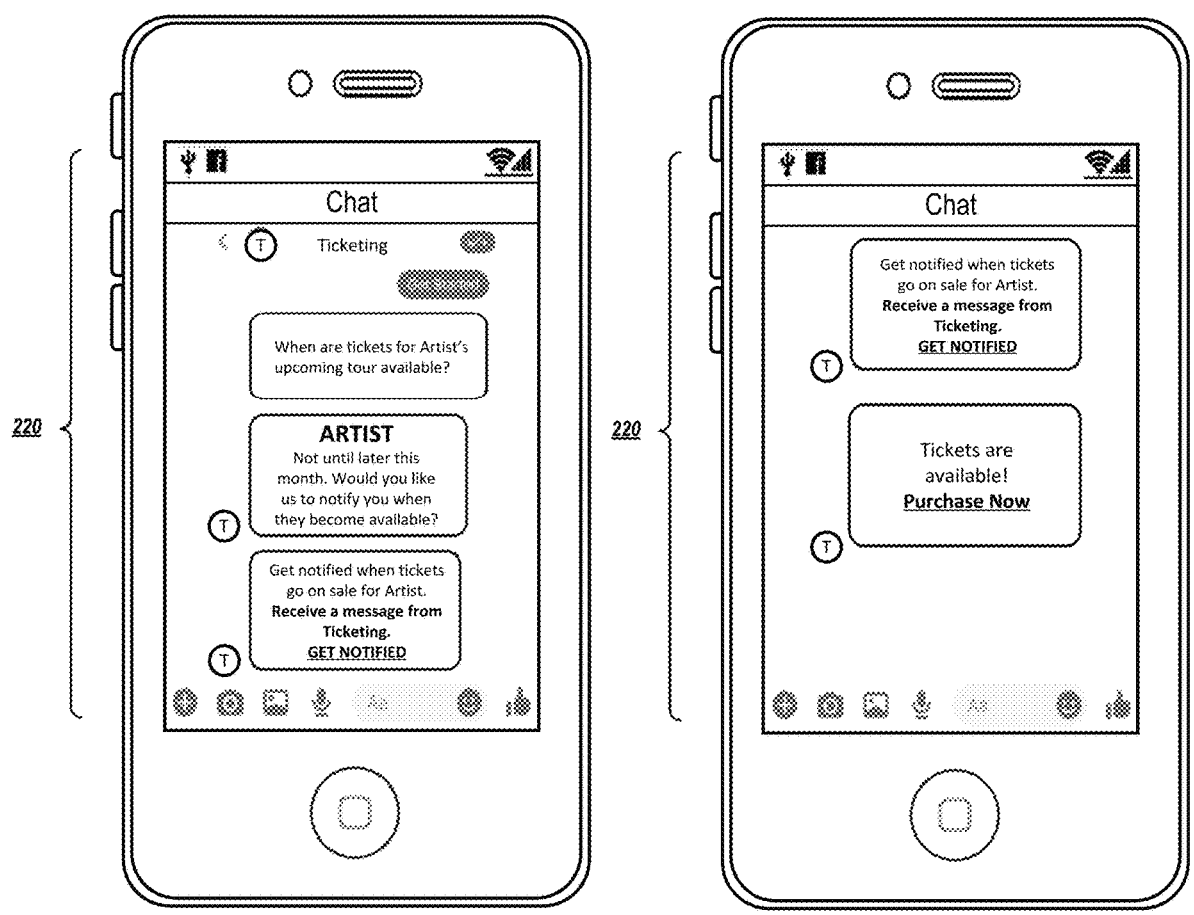
FIG. 2B depicts a second exemplary interface for opt-in and follow-up messaging.

FIG. 2B depicts an exemplary messaging interface 220 for opt-in and follow-up messaging according to one or more exemplary embodiments. A user may initiate conversation or otherwise engage with a ticketing business page (called "Ticketing"), which may be a ticket sales and distribution company. The opt-in and follow-up messaging exchange between the user and Ticketing may be similar to the exchange of FIG. 2A.

As shown, the user may ask the ticketing business page "When are tickets for Artist's upcoming tour available?" Artist may be the stage name of the singer-performer. The page may respond with an image of Artist and accompany text stating "Not until later this month. Would you like us to notify you when they become available?" An opt-in message may then be presented to the user, which may state "Get notified when tickets go on sale for Artist. Receive a message from Ticketing."

In response, the user may select the "Get Notified" icon presented to the user in the opt-in message or may simply respond to the message with an explicit indication that the user desires to opt-in, such as "opt me in," "opt in," "notify me," "OK sure," "yes," and so on. When the tickets go on sale, the ticketing business page may send the user a follow-up message or notification that recites "Tickets are available!" with a selectable icon for purchasing the tickets.

Figure 2C:
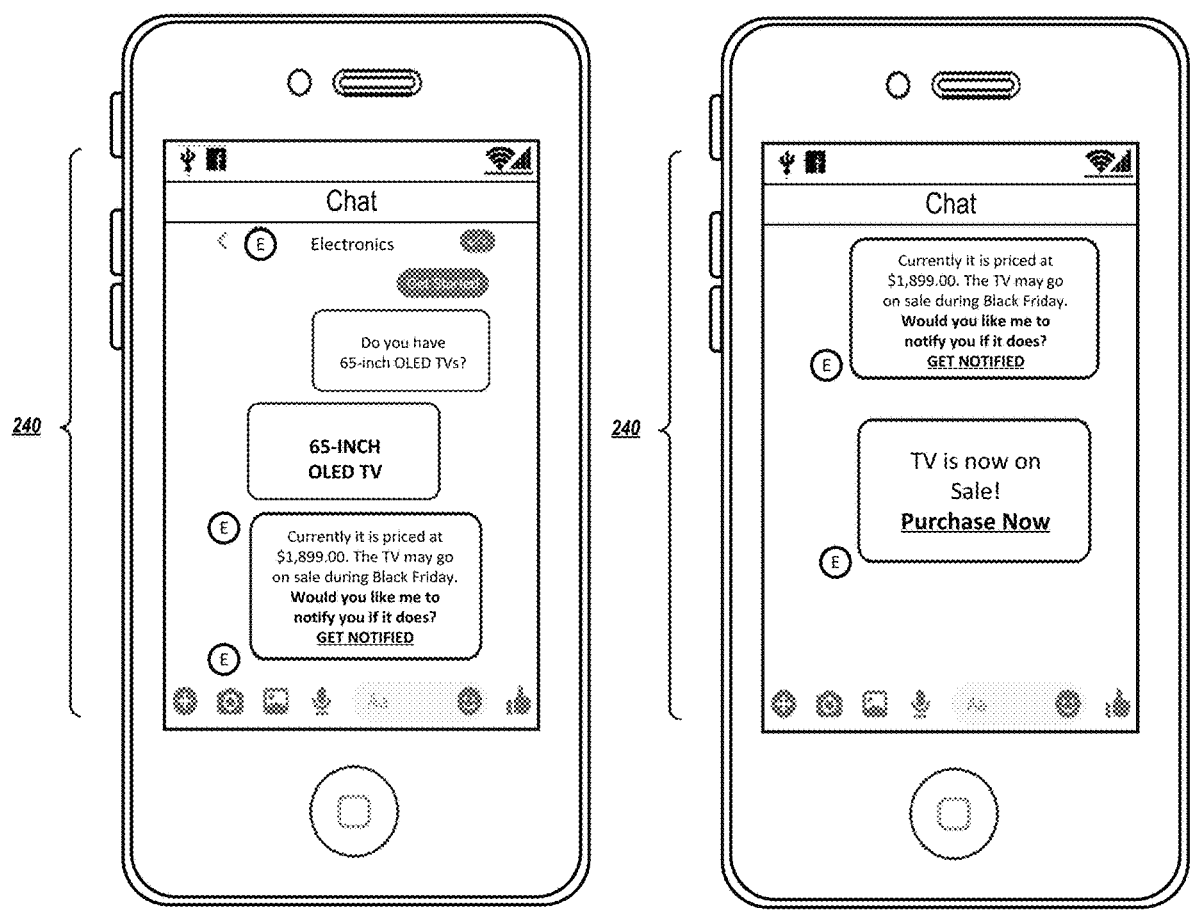
FIG. 2C depicts a third exemplary interface for opt-in and follow-up messaging.

FIG. 2C depicts an exemplary messaging interface 240 for opt-in and follow-up messaging according to one or more exemplary embodiments. A user may initiate conversation with an electronics business page (called "Electronics"). The opt-in and follow-up messaging exchange between the user and Electronics may be similar the exchanges of FIGS. 2A and 2B.

As shown, the user may ask the electronics business page "Do you have 65-inch OLED TVs?" The page may display an image of an OLED TV and respond "Currently, it is priced at $1,899.00. The TV may go on sale during Black Friday. Would you like me to notify you if it does?" This question may be embedded as part of the opt-in message the user receives on the messaging interface 240.

The user may respond by selecting the "Get Notified" icon in the opt-in message. When the TV does go on sale on Black Friday, the user may receive a follow-up message indicating that the 65-inch OLED TV of previous user interest is now on sale. The user may then press the "Purchase Now" icon to attempt to purchase the TV at the sale price.

Figure 2D:
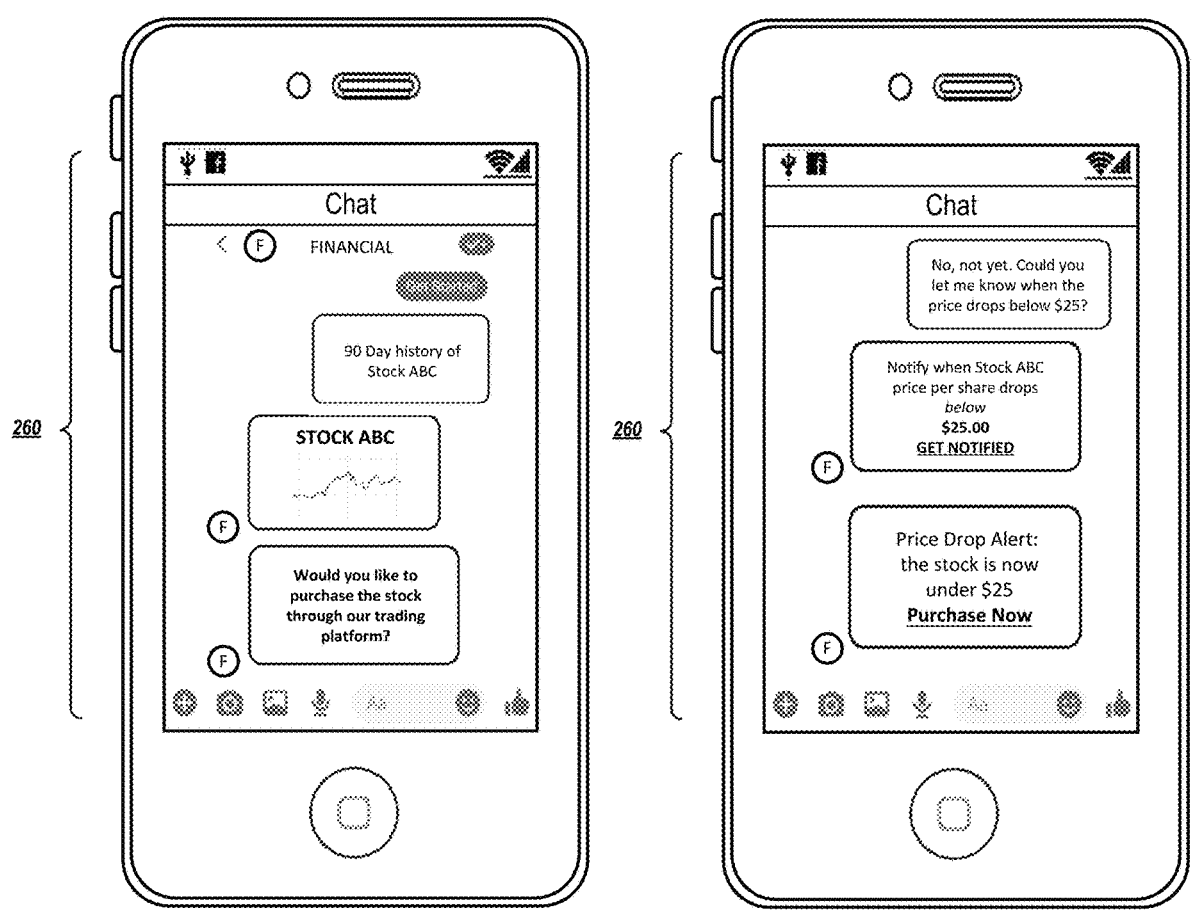
FIG. 2D depicts a fourth exemplary interface for opt-in and follow-up messaging.

FIG. 2D depicts an exemplary messaging interface 260 for opt-in and follow-up messaging according to one or more exemplary embodiments. A user may initiate conversation with a financial business page (called "Financial"). The opt-in and follow-up messaging exchange between the user and Electronics may be similar the exchanges of FIGS. 2A to 2C.

As illustrated, the user may ask the financial business page to pull up a 90-day price history of stock symbol, ABC. The page may then respond with a graphic or image of the 90-day chart, which can be selected and interacted with by the user. The page may also follow up with the message "Would you like to purchase the stock through our trading platform?"

The user may respond by stating "No, not yet. Could you let me know when the price drops below $25?" Then, the page may send the user an opt-in message stating "Notify when Stock ABC price per share drops below $25.00." The user may select the "Get Notified" icon in the opt-in message or otherwise opt-in in a separate message, as described above.

When the price drop occurs, the financial business page may send a follow-up notification reciting "Price Drop Alert: the stock is now under $25." The user may select the "purchase now" icon in the follow-up message to purchase ABC stock through Financial's trading platform.

Additional Features to Opt-In and Follow-Up Messaging

Figure 3A:
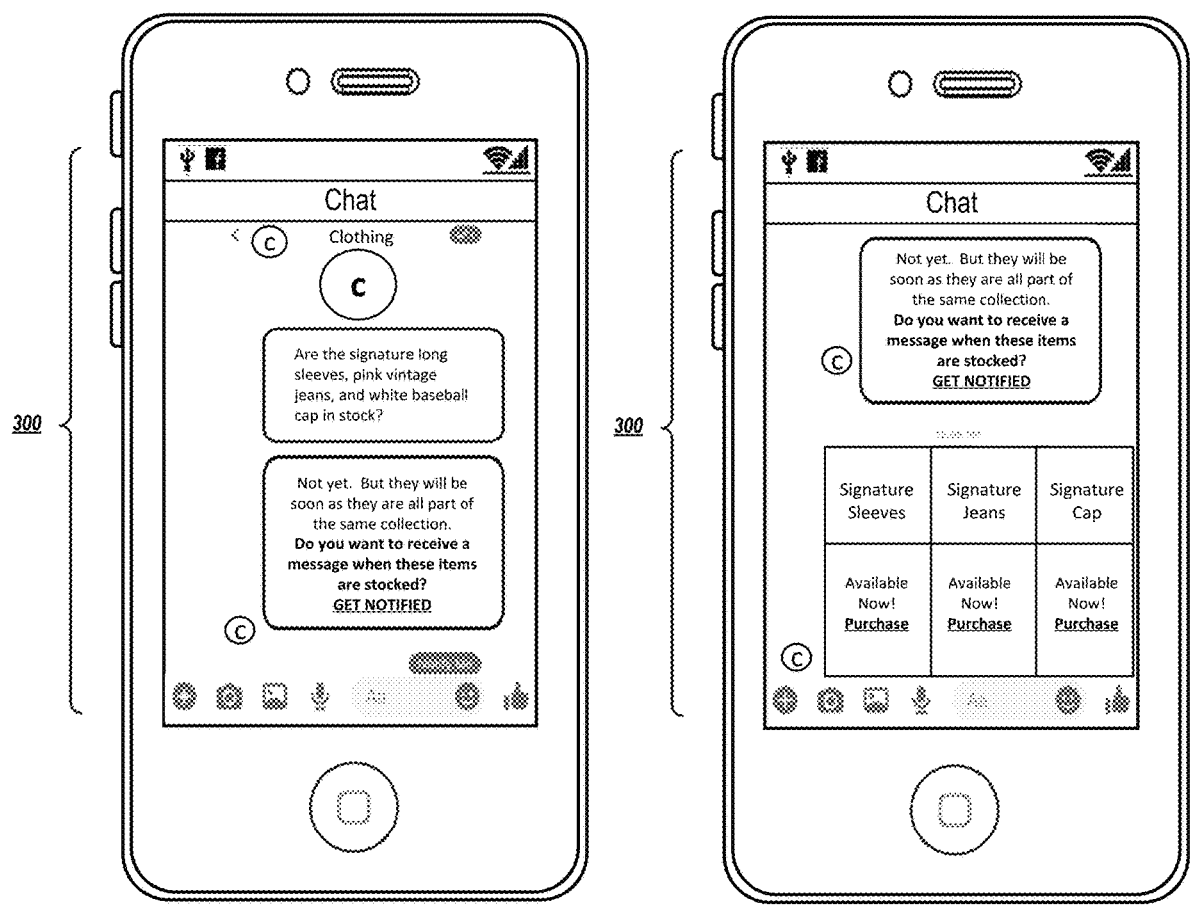
FIG. 3A depicts an exemplary interface for one-time follow-up messaging on multiple topics.

FIG. 3A depicts an exemplary messaging interface 300 for opt-in and follow-up messaging on multiple topics according to one or more exemplary embodiments. For ease of explanation, the above example of FIG. 2A will be used to describe the features of FIG. 3A.

In some examples, the user communicating with the clothing business page may inquire about multiple items in the same communication session. The inquiry may be sent as one message, as shown, or may be included in separate messages to the page. For instance, the user may ask whether the signature black long sleeve shirt, the signature pink vintage distressed jeans, and the signature white baseball cap are in stock. All of these items may be part of the same fall collection.

Since the items may be part of the same collection, they may be restocked at the same time or near the same time. Thus, rather than sending a separate follow-up message or notification for each item, a one-time follow-up message that includes updates on the multiple items may be sent to the user via the messaging interface 300.

As illustrated, in one exemplary embodiment, the one-time follow up message may be presented to the user in a carousel display format. The user can view the updates for each of the separate items directly in the follow-up message by swiping left or right on the carousel interface. The user may also select the respective "purchase" icons to purchase the item. Other ways of displaying the multiple updates are possible, such as formatting the one-time follow up message to allow the user to scroll up or down.

Figure 3B:
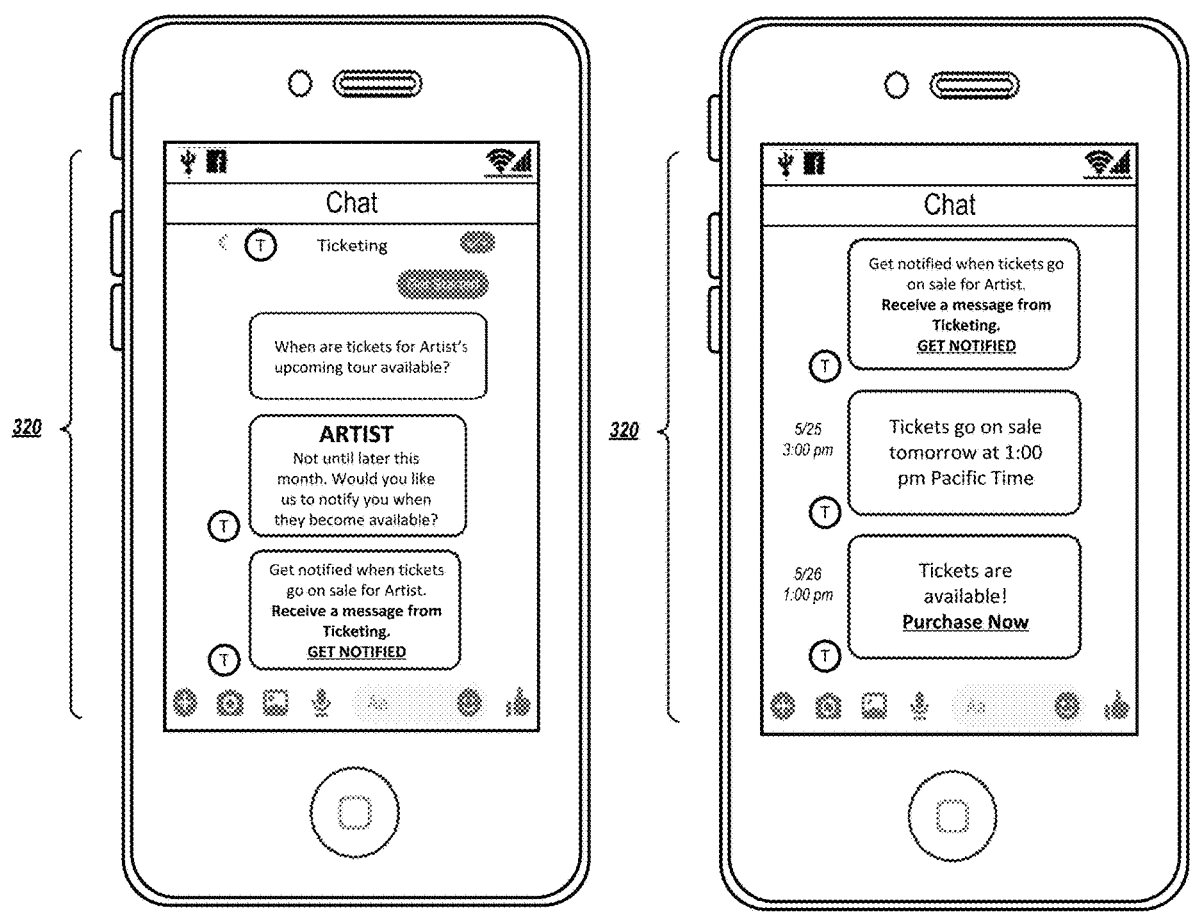
FIG. 3B depicts an exemplary interface for multiple follow-up updates.

FIG. 3B depicts an exemplary messaging interface 320 for opt-in and follow-up messaging by multiple updates according to one or more exemplary embodiments. For ease of explanation, the above example of FIG. 2B will be used to describe the features of FIG. 3B.

In the context of purchasing tickets, for example, it may make sense for the user to receive multiple updates on the expected availability of the concert tickets. It may be understood that the multiple updates are limited to a single promotion topic, such as the availability of Artist concert tickets.

As shown, the user may receive a first update on May 25 at 3:00 pm that the concert tickets will be going on sale the following day at 1:00 pm Pacific Time. In at least this regard, the first update serves as a reminder, alert, or warning so that the user can appropriately prepare to purchase the tickets at the indicated date and time, which enhances the page-user experience. The next day, on May 26 at 1:00 µm, the user may receive a second update indicating that the tickers are now available for purchase. One way to prevent business pages from taking advantage of or abusing this feature may be to cap the total number of updates that can be sent.

Exemplary Information Exchange

Figure 4:
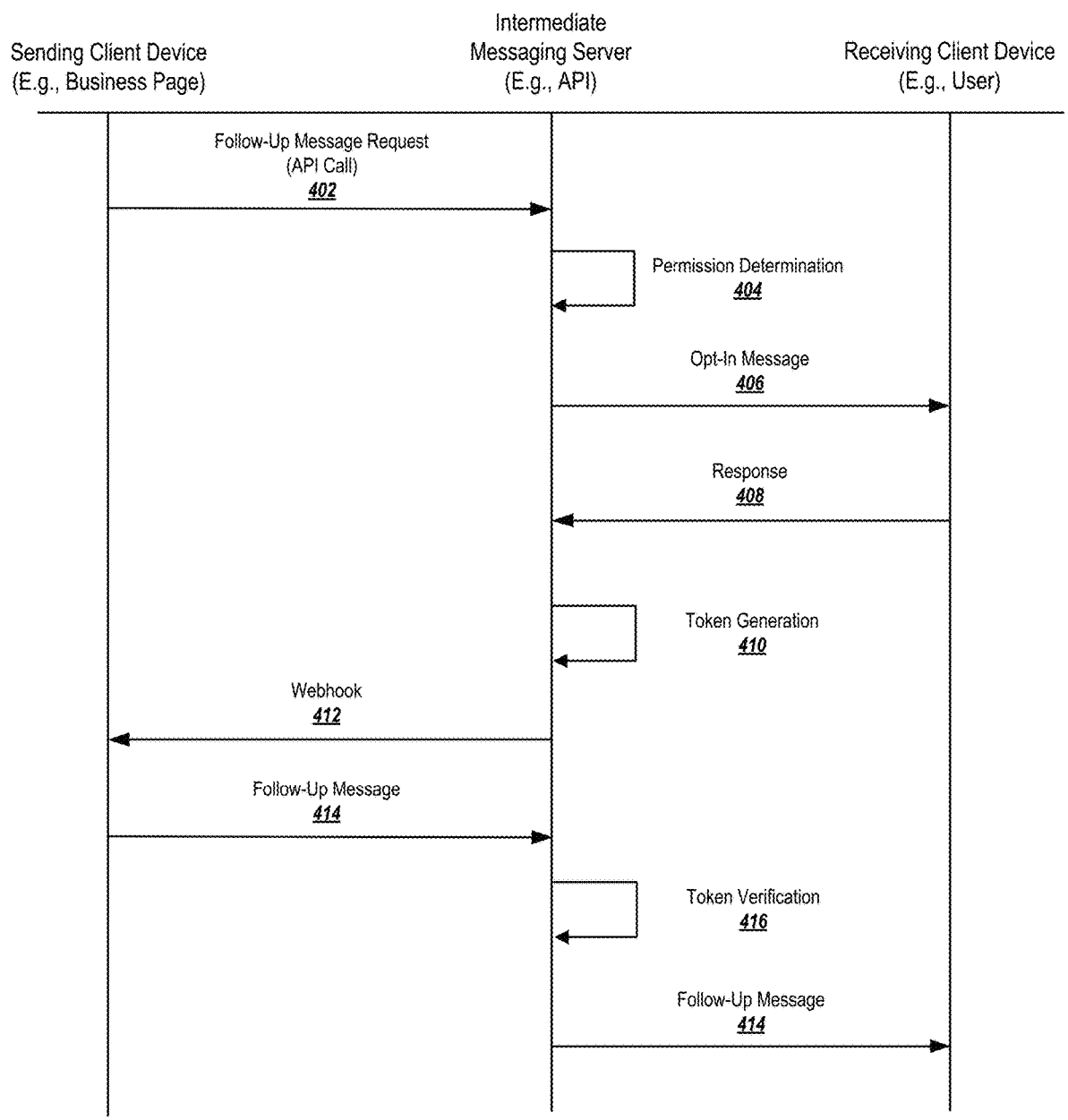
FIG. 4 is an exemplary data flow diagram depicting information exchange among computing systems in an exemplary embodiment.

FIG. 4 is an exemplary data flow diagram showing 400 according to one or more exemplary embodiments. The data flow diagram 400 shows the communicative interaction among at least a sending client device (e.g., business page), intermediate messaging server (e.g., API), and receiving client device (e.g., user) for performing opt-in and follow-up messaging. Similar to FIG. 1, at least the communicating components of FIG. 4 may be part of or included in a messaging or communication system 400. The sending client device may be associated with any of the business pages illustrated and described above. The receiving client device may be associated with or belong to any user communicating with the sending client device.

As illustrated, the sending client device may send a follow-up message request 402 to the intermediate messaging server as an API call in order to send follow-up message(s) to the receiving client device after an allotted promotion period (e.g., 24 hours) has expired. The messaging server may receive the follow-up message request 402 and determine whether the sending client device has previously applied and obtained requisite permission (e.g., permission determination 404) to send follow-up messages. As described above, the business page associated with the sending client device may be granted permission if the business page agrees to certain terms and meets one or more criteria (e.g., the business page has not previously violated messaging policies). In some examples, the permission may also be auto granted if the business page has agreed to the terms and does not have a prior history to compare against the one or more criteria.

Upon or after determining that the sending client device possesses requisite permission, the messaging server may render or process a template of the request and send the receiving client device an opt-in message 406 based on the information provided in the template. In examples, the opt-in message may be similar to the opt-in messages described above with respect to FIGS. 2A to 2D. The opt-in message may ask the user of the receiving client device whether the user would like to opt in to receive at least one follow-up message or notification from the business page regarding a particular promotion of previous user interest.

The intermediate messaging server may then determine whether a qualifying response from the receiving client device has been received, and in some examples, whether the response has been received within a predetermined period of time (e.g., 2 hours, 5 hours). If a response is not received within the predetermined period of time, then the intermediate messaging server may interpret that mean that the user does not want to opt-in or receive follow-up messages and may tag or identify such non-response as a non-qualifying response.

A qualifying response, such as response 408 as shown, may be any response (e.g., selection of "notify me" icon by the user, typing and sending "notify me" via messaging interface, affirmative confirmations such as "yes" or "OK," etc.) from the receiving client device that explicitly indicates the user's desire and intent to opt in and receive at least one follow-up message from the business page. As described above, in some examples, the qualifying response must be an response that must explicitly include certain terms, such as "notify me" or "opt-in." Thereafter, the qualified response 408 may trigger a web callback, webhook 412, HTTP push API, etc., which may notify the sending client device that the user has opted in and desires to receive the follow-up message(s) or notification(s).

Before the webhook 412 occurs, the intermediate messaging server may generate a token (e.g., token generation 410) that is unique to the page-user pair. According to embodiments, the unique token is the mechanism that is later used by the sending client device to send the receiving client device the follow-up message or notification outside the 24-hour messaging window. In examples, the generated token may be stored at the messaging server (e.g., in secure memory, in a secure data store, in a secure database). The token may be provided to the sending client device via the webhook 412, or in some examples, it may be sent separately.

The generated token for the page-user pair may expire after a predefined period of time, e.g., three months, etc. Moreover, a predefined token count (e.g., 20 tokens) may be imposed on the business page for the receiving client device within a predefined time frame, e.g., a year. Each time the token is used by the sending client device, the total token count may be decremented by a predefined value, e.g., one. When a follow-up event occurs and the sending client device is ready to send a follow-up message or notification to the receiving client device, it may send follow-up message 414 with the token previously provided by the messaging server.

Upon receiving the follow-up message 414 and the token from the sending client device, the messaging server may perform token verification 416 to verify whether the token included in the follow-up message matches the token previously generated and stored by the messaging server. If the two tokens match, then the messaging server may confirm a successful verification of the tokens and may then follow-up message 414 to the receiving client device. If the two tokens do not match (or if a token was not received with the follow-up message 414 or if the token was received after the allotted predefined time frame), the follow-up message is not sent by the messaging server.

In some examples, in addition to the token, the sending client device may be required to send the follow-up message with a special tag. For instance, the tag may identify the page-user pair or may indicate the type of follow-up message being sent (e.g., one-time follow up, multiple updates, retail-based, service-based, etc.). The information derived from a tag may be used by intermediate messaging server to track the all follow-up messages or notification corresponding to the page-user pair and to further ensure that existing messaging policies are not violated by the sending client device.

It may be understood that the follow-up message 414 may be formatted in any suitable manner, e.g., one-time message containing follow-up information on only one promotion topic, one-time message containing follow-up information on multiple promotion topics, multiple follow-up updates, etc.

It may further be understood that a token may be a software-based token used to authorize, authenticate, verify, etc. the party using the token. For example, the token may be based at least in part on shared secret and public-key cryptographies. As described above, the tokens may each be respectively and securely stored in memory of the parties receiving it. Further, although the messaging server is configured to generate the token, it may be possible for other system components, such as a dedicated security server or the like, to generate the token.

Exemplary Logic

Exemplary logic for implementing the above-described embodiments is next described in connection with FIG. 5. The exemplary logic may be implemented in hardware, software, or a combination of hardware and software (e.g., being implemented at least partially in hardware).

Figure 5:
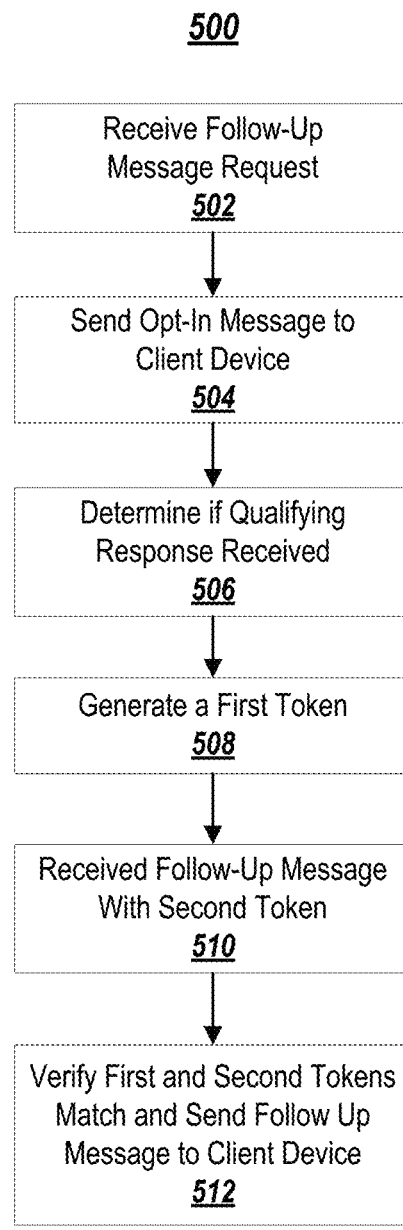
FIG. 5 is an exemplary flowchart depicting messaging server logic for facilitating opt-in and follow-up messaging.

FIG. 5 is a flowchart depicting exemplary logic 500 performed by a system, such as a messaging server, an intermediate server, a backend server, a system server, etc. for facilitating the opt-in and follow-up messaging between a business page and a user via one or more APIs, as described above. The logic 500 may be embodied as digital logic, which may be implemented at least partially in hardware, embodying instructions for a processor circuit to perform the steps described below. Although FIG. 5 depicts a particular arrangement of logical elements in a particular order, it is understood that the configuration depicted in FIG. 5 is but one example. In other embodiments, more elements may be provided and/or some elements may be omitted, some elements may be performed in parallel, and/or elements may be performed in a different order.

At block 502, a request for sending a follow-up message to a client device may be received. In examples, the request may be sent by a business page, which may desire to send a user of the client device a follow-up message regarding previously discussed promotional content outside of an allotted messaging time period (e.g., 24-hour window) for sending promotional content. As described above, the request may be formatted as a template containing various types of information (e.g., disclaimer, content, title). But only the title and the payload of the template may be customizable by the business page.

At block 504, assuming the business page has the requisite permission to send the follow-up message request, the template of the request may be processed to generate an opt-in message, which may be sent to the client device. The opt-in message may inform that the user of the client device will receive a follow-up message or notification related to the promotional content of previous user interest (e.g., clothing item, concert item, television, stock) and the opt-in message may contain an opt in icon, which can be selected or pressed by the user.

At block 506, it may be determined whether a qualifying response to the opt-in message has been received. As described above, a qualifying response to the opt-in message may include the user selecting the opt-in icon displayed in the opt-in message, replying to the opt-in message with "opt in," "notify me," "yes," "OK" or any other suitable response that affirmatively or explicitly confirms the opt-in. In some examples, the qualifying response must explicitly include certain keywords such as "opt-in" or "notify." In examples, in response to receiving a qualifying response to the opt-in message, the business page may be sent a web callback or webhook notifying the page of the opt-in by the user.

At block 508, a first token may be generated based on the determination at block 506 that a qualifying response to the opt-in message has been received. In examples, the token may be a unique software token corresponding to the page-user pair. For the business page to send the follow-up message to the client device, the page must use this token.

At block 510, a follow-up message with a second token may be received. Verification may be performed to determine if the first token generated at block 508 and the second token received at block 510 match. For example, if the first and second tokens are identical, then a successful verification can be confirmed.

At block 512, based on the successful verification of the first and second tokens matching, the follow-up message may be sent to the client device. As described above, the follow-up message may be presented to the user in various ways. For instance, it may be a one-time message containing enough information to convey the occurrence of a follow-up event related to the previously discussed promotional content. In other instances, a one-time follow-up message on multiple topics may sent. In further instances, the user may receive multiple follow-up notifications especially if it is important to relay to the user multiple occurrences of important follow-up events.

It may be understood that, in some examples, the above described opt-in and follow-up messaging may be implemented via plug-in, which may be a separate software component that adds the opt-in and follow-up messaging functionality in existing computer programs. It may further be understood that, alternatively, the opt-in and follow-up messaging functionality may be implemented into any platform, such as a standalone messaging platform, social media platforms having messaging capability, social networking platforms with messaging capability, etc.

Moreover, it may be understood that the above described API(s) can be supported by more than one hardware or software component and can be any suitable messaging API operating as part of the messaging platform that can support or execute the opt-in and follow-up messaging features. Business pages and the implementation thereof may be executed, supported, or provided on one or more client devices associated with the business, such as business computing devices that employees or business representatives can utilize.

Communications System Overview

Figure 6C:
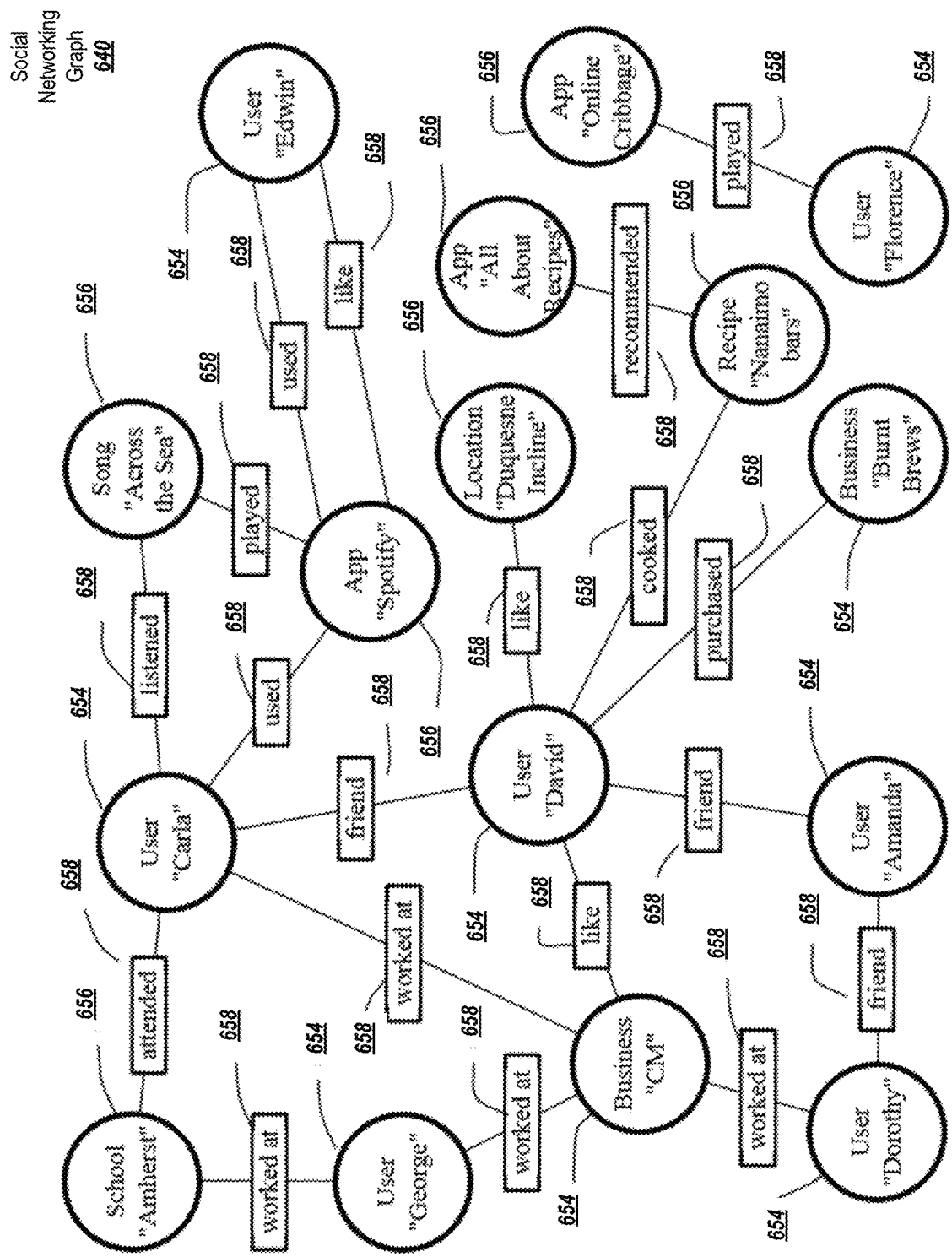
FIG. 6C depicts a social networking graph.

These examples may be implemented by a communications system that is provided locally, at a client device, or remotely (e.g., at a remote server), or some combination thereof. FIGS. 6A to 6C depict various examples of communications systems, and are discussed in more detail below.

FIG. 6A depicts an exemplary centralized communications system 600, which facilitates encrypted communication between two or more users (e.g., business page user and a potential customer user). The centralized system 600 may implement some or all of the structure and/or operations of a messaging or communications service in a single computing entity, such as entirely within a single centralized messaging server device, e.g., communications server 626.

The communications system 600 may include a computer-implemented system having software applications that include one or more components. Although the communications system 600 shown in FIG. 6A has a limited number of elements in a certain topology, the communications system 600 may include more or fewer elements in alternate topologies.

A communications system 600 may be generally arranged to receive, store, and deliver communications, such as messages. The communications may include or may be associated with media or content items.

A client device 610 may transmit communications addressed to one or more recipient users, user accounts, or other identifiers resolving to receiving client devices 610. In exemplary embodiments, each of the client devices 610 and their respective messaging clients 620 are associated with a particular user or users of the communications service 600. In some embodiments, the client devices 610 may be cellular devices such as smartphones and may be identified to the communications service 600 based on a phone number associated with each of the client devices 610. In some embodiments, each client may be associated with a user account registered with the communications service 600. In general, each client may be addressed through various techniques for the reception of communications. While in some embodiments the client devices 610 may be cellular devices, in other embodiments one or more of the client devices 610 may be personal computers, tablet devices, any other form of computing device.

The client 610 may include one or more input devices 612 and one or more output devices 618. The input devices 612 may include, for example, microphones, keyboards, cameras, electronic pens, touch screens, and other devices for receiving inputs including message data, requests, commands, user interface interactions, selections, and other types of input. The output devices 618 may include a speaker, a display device such as a monitor or touch screen, and other devices for presenting an interface to the communications system 600.

The client 610 may include a memory, which may be a non-transitory computer readable storage medium, such as one or a combination of a hard drive, solid state drive, flash storage, read only memory, or random access memory. The memory may a representation of an input 614 and/or a representation of an output 616, as well as one or more applications. For example, the memory may store a messaging client 620 and/or a social networking client that allows a user to interact with a social networking service.

The input 614 may be textual, such as in the case where the input device 612 is a keyboard. Alternatively, the input 614 may be an audio or video recording, such as in the case where the input device 612 is a microphone or camera.

The input 614 may be subjected to automatic speech recognition (ASR) logic in order to transform the audio recording to text that is processable by the communication system. The ASR logic may be located at the client device 610 (so that the audio recording is processed locally by the client 610 and corresponding text is transmitted to the communications server 626), or may be located remotely at the communications server 626 (in which case, the audio recording may be transmitted to the communications server 626 and the communications server 626 may process the audio into text). Other combinations are also possible—for example, if the input device 612 is a touch pad or electronic pen, the input 614 may be in the form of handwriting, which may be subjected to handwriting or optical character recognition analysis logic in order to transform the input 612 into processable text.

The client 610 may be provided with a network interface 622 for communicating with a network 624, such as the Internet. The network interface 622 may transmit the input 612 in a format and/or using a protocol compatible with the network 624 and may receive a corresponding output 616 from the network 624.

The network interface 622 may communicate through the network 624 to a communications server 626, which may be operative to receive, store, and forward messages between messaging clients.

The communications server 626 may include a network interface 622, communications preferences 628, and communications logic 630. The communications preferences 628 may include one or more privacy settings for one or more users and/or video communications. For example, the communications preferences 628 may include one or more settings, including default settings, for the logic described herein.

The communications logic 630 may include opt-in messaging logic 632 for allowing a user, such as a business page, to send a follow-up promotion-related message to a user outside a permitted messaging window via at least one API executed, supported, or provided by the communications server 626, as described above.

The network interface 622 of the client 610 and/or the communications server 626 may also be used to communicate through the network 624 with a social networking server 636. The social networking server 636 may include or may interact with a social networking graph 638 that defines connections in a social network. Furthermore, the communications server 626 may connect to the social networking server 636 for various purposes, such as retrieving connection information, messaging history, event details, etc. from the social network.

A user of the client 610 may be an individual (human user), an entity (e.g., an enterprise, business, or third-party application), or a group (e.g., of individuals or entities) that interacts or communicates with or over the social networking server 636. The social-networking server 636 may be a network-addressable computing system hosting an online social network. The social networking server 636 may generate, store, receive, and send social-networking data, such as, for example, user-profile data, concept-profile data, social-graph information, or other suitable data related to the online social network. The social networking server 636 may be accessed by the other components of the network environment either directly or via the network 624.

The social networking server 636 may include an authorization server (or other suitable component(s)) that allows users to opt in to or opt out of having their actions logged by social networking server 636 or shared with other systems (e.g., third-party systems, such as the communications server 626), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social networking server 636 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 638. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 636 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 636 may send a request to the data store for the object. The request may identify the user associated with the request. The requested data object may only be sent to the user (or a client system 610 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social networking server 636 or explicit connections of a user to a node, object, entity, brand, or page on social networking server 636. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 6A may be well-suited to deployment as a new system or as an upgrade to an existing system, because the logic is incorporated into the communications server 626. In contrast, FIG. 6B depicts an exemplary distributed communications system 650, in which functionality for selecting dominant/relevant participants and displaying a reduced-size interface is distributed and remotely accessible from the messaging server. Examples of a distributed system 650 include a client-server architecture, a 3-tier architecture, an N-tier architecture, a tightly coupled or clustered architecture, a peer-to-peer architecture, a master-slave architecture, a shared database architecture, and other types of distributed systems.

Many of the components depicted in FIG. 6B are identical to those in FIG. 6A, and a description of these elements is not repeated here for the sake of brevity. The primary difference between the centralized embodiment and the distributed embodiment is the addition of a separate opt-in messaging server 652, which hosts the relevant opt-in messaging logic 632. The opt-in messaging server 652 may be distinct from the communications server 626 but may communicate with the communications server 626, either directly or through the network 624, to provide the functionality of the opt-in messaging logic 632 to the communications server 626.

The embodiment depicted in FIG. 6B may be particularly well suited to allow exemplary embodiments to be deployed alongside existing messaging or communication systems, for example when it is difficult or undesirable to replace an existing messaging server. Additionally, in some cases the communications server 626 may have limited resources (e.g. processing or memory resources) that limit or preclude the addition of the additional pivot functionality. In such situations, the capabilities described herein may still be provided through a separate messaging server, such as the opt-in messaging server 652.

FIG. 6C illustrates an example of a social networking graph 638. In exemplary embodiments, a social networking service may store one or more social graphs 638 in one or more data stores as a social graph data structure via the social networking service.

The social graph 638 may include multiple nodes, such as user nodes 654 and concept nodes 656. The social graph 638 may furthermore include edges 658 connecting the nodes. The nodes and edges of social graph 638 may be stored as data objects, for example, in a data store (such as a social-graph database). Such a data store may include one or more searchable or queryable indexes of nodes or edges of social graph 638.

The social graph 638 may be accessed by a social-networking server 626, client system 610, third-party system, or any other approved system or device for suitable applications.

A user node 654 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 654 corresponding to the user, and store the user node 654 in one or more data stores. Users and user nodes 654 described herein may, where appropriate, refer to registered users and user nodes 654 associated with registered users. In addition, or as an alternative, users and user nodes 654 described herein may, where appropriate, refer to users that have not registered with the social-networking system. In particular embodiments, a user node 654 may be associated with information provided by a user or information gathered by various systems, including the social-networking system. As an example, and not by way of limitation, a user may provide their name, profile picture, contact information, birth date, sex, marital status, family status, employment, education background, preferences, interests, or other demographic information. In particular embodiments, a user node 654 may be associated with one or more data objects corresponding to information associated with a user. In particular embodiments, a user node 654 may correspond to one or more webpages. A user node 654 may be associated with a unique user identifier for the user in the social-networking system.

In particular embodiments, a concept node 656 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 656 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 656 may be associated with one or more data objects corresponding to information associated with concept node 656. In particular embodiments, a concept node 656 may correspond to one or more webpages.

In particular embodiments, a node in social graph 638 may represent or be represented by a webpage (which may be referred to as a "profile page"). Profile pages may be hosted by or accessible to the social-networking system. Profile pages may also be hosted on third-party websites associated with a third-party server. As an example, and not by way of limitation, a profile page corresponding to a particular external webpage may be the particular external webpage and the profile page may correspond to a particular concept node 656. Profile pages may be viewable by all or a selected subset of other users. As an example, and not by way of limitation, a user node 654 may have a corresponding user-profile page in which the corresponding user may add content, make declarations, or otherwise express himself or herself. A business page may comprise a user-profile page for a commerce entity. As another example and not by way of limitation, a concept node 656 may have a corresponding concept-profile page in which one or more users may add content, make declarations, or express themselves, particularly in relation to the concept corresponding to concept node 656.

In particular embodiments, a concept node 656 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 654 corresponding to the user and a concept node 656 corresponding to the third-party webpage or resource and store edge 658 in one or more data stores.

In particular embodiments, a pair of nodes in social graph 638 may be connected to each other by one or more edges 658. An edge 658 connecting a pair of nodes may represent a relationship between the pair of nodes. In particular embodiments, an edge 658 may include or represent one or more data objects or attributes corresponding to the relationship between a pair of nodes. As an example, and not by way of limitation, a first user may indicate that a second user is a "friend" of the first user. In response to this indication, the social-networking system may send a "friend request" to the second user. If the second user confirms the "friend request," the social-networking system may create an edge 658 connecting the first user's user node 654 to the second user's user node 654 in social graph 638 and store edge 658 as social-graph information in one or more data stores. In the example of FIG. 6C, social graph 638 includes an edge 658 indicating a friend relation between user nodes 854 of user "Amanda" and user "Dorothy." Although this disclosure describes or illustrates particular edges 658 with particular attributes connecting particular user nodes 654, this disclosure contemplates any suitable edges 658 with any suitable attributes connecting user nodes 654. As an example, and not by way of limitation, an edge 658 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 638 by one or more edges 658.

In particular embodiments, an edge 658 between a user node 654 and a concept node 656 may represent a particular action or activity performed by a user associated with user node 654 toward a concept associated with a concept node 656. As an example, and not by way of limitation, as illustrated in FIG. 6C, a user may "like," "attended," "played," "listened," "cooked," "worked at," or "watched" a concept, each of which may correspond to an edge type or subtype. A concept-profile page corresponding to a concept node 656 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 658 and a "used" edge (as illustrated in FIG. 6C) between user nodes 654 corresponding to the user and concept nodes 656 corresponding to the song and application to indicate that the user listened to the song and used the application. Moreover, the social-networking system may create a "played" edge 658 (as illustrated in FIG. 6C) between concept nodes 656 corresponding to the song and the application to indicate that the particular song was played by the particular application. In this case, "played" edge 658 corresponds to an action performed by an external application (SPOTIFY) on an external audio file (the song "Across the Sea"). Although this disclosure describes particular edges 658 with particular attributes connecting user nodes 654 and concept nodes 656, this disclosure contemplates any suitable edges 658 with any suitable attributes connecting user nodes 654 and concept nodes 656. Moreover, although this disclosure describes edges between a user node 654 and a concept node 656 representing a single relationship, this disclosure contemplates edges between a user node 654 and a concept node 656 representing one or more relationships. As an example, and not by way of limitation, an edge 658 may represent both that a user likes and has used at a particular concept. Alternatively, another edge 658 may represent each type of relationship (or multiples of a single relationship) between a user node 654 and a concept node 656 (as illustrated in FIG. 6C between user node 654 for user "Edwin" and concept node 656 for "SPOTIFY").

In particular embodiments, the social-networking system may create an edge 658 between a user node 654 and a concept node 656 in social graph 638. As an example, and not by way of limitation, a user viewing a concept-profile page (such as, for example, by using a web browser or a special-purpose application hosted by the user's client system) may indicate that he or she likes the concept represented by the concept node 656 by clicking or selecting a "Like" icon, which may cause the user's client system to send to the social-networking system a message indicating the user's liking of the concept associated with the concept-profile page. In response to the message, the social-networking system may create an edge 658 between user node 654 associated with the user and concept node 656, as illustrated by "like" edge 658 between the user and concept node 656. In particular embodiments, the social-networking system may store an edge 658 in one or more data stores. In particular embodiments, an edge 658 may be automatically formed by the social-networking system in response to a particular user action. As an example, and not by way of limitation, if a first user uploads a picture, watches a movie, or listens to a song, an edge 658 may be formed between user node 654 corresponding to the first user and concept nodes 656 corresponding to those concepts. Although this disclosure describes forming particular edges 658 in particular manners, this disclosure contemplates forming any suitable edges 658 in any suitable manner.

The social graph 638 may further comprise a plurality of product nodes. Product nodes may represent particular products that may be associated with a particular business. A business may provide a product catalog to a consumer-to-business service and the consumer-to-business service may therefore represent each of the products within the product in the social graph 638 with each product being in a distinct product node. A product node may comprise information relating to the product, such as pricing information, descriptive information, manufacturer information, availability information, and other relevant information. For example, each of the items on a menu for a restaurant may be represented within the social graph 638 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 638. The information for a product node may be manipulated by the social-networking system as a product object that encapsulates information regarding the referenced product.

As such, the social graph 638 may be used to infer shared interests, shared experiences, or other shared or common attributes of two or more users of a social-networking system. For instance, two or more users each having an edge to a common business, product, media item, institution, or other entity represented in the social graph 638 may indicate a shared relationship with that entity, which may be used to suggest customization of a use of a social-networking system, including a messaging system, for one or more users.

The embodiments described above may be performed by a messaging architecture, an example of which is next described with reference to FIG. 7.

Messaging Architecture

Figure 7:
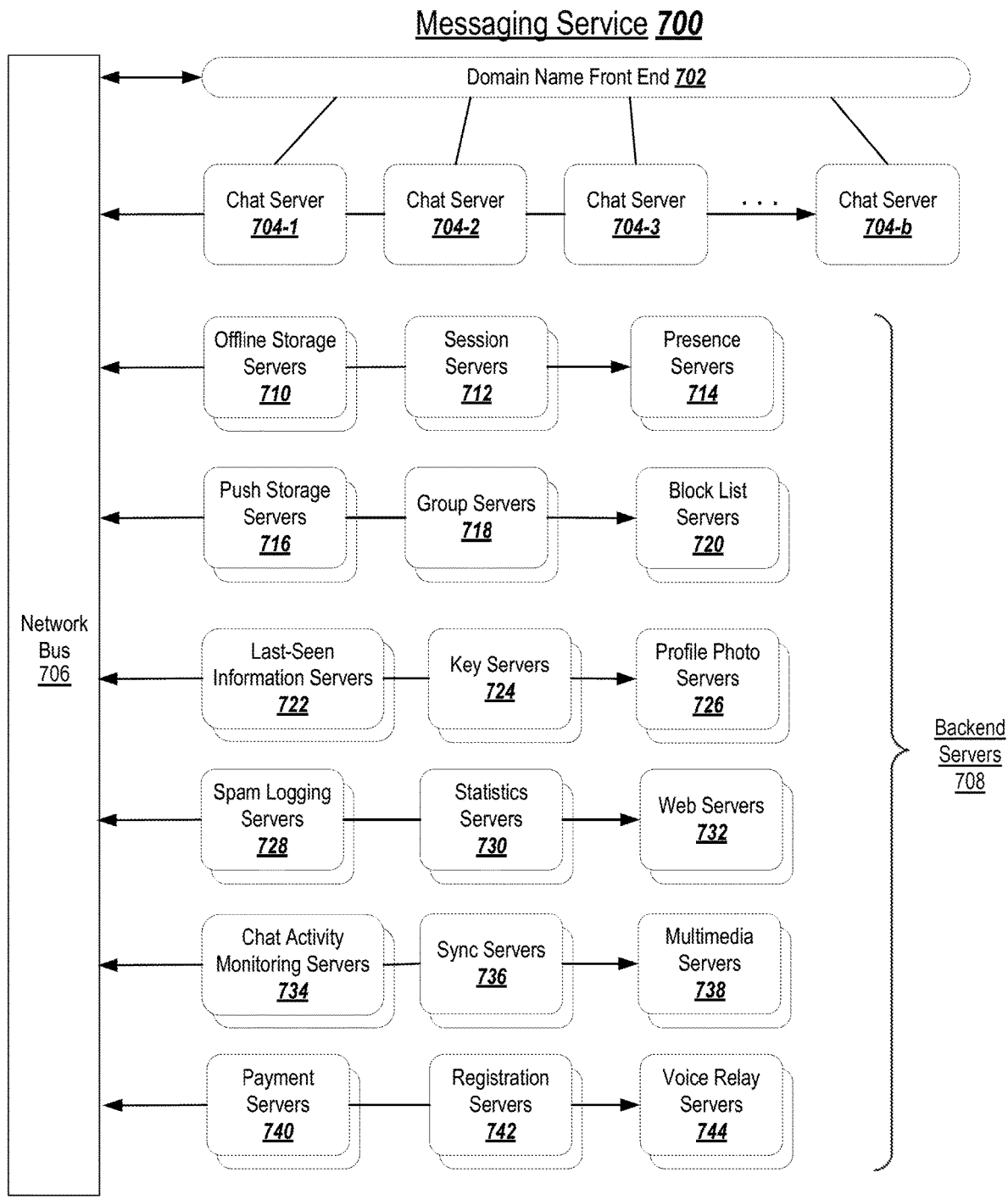
FIG. 7 is a block diagram depicting an example of a system for a messaging service.

FIG. 7 illustrates an embodiment of a plurality of servers implementing various functions of a messaging service 700 suitable for use with exemplary embodiments. It will be appreciated that different distributions of work and functions may be used in various embodiments of a messaging service 700.

The messaging service 700 may comprise a domain name front end 702. The domain name front end 702 may be assigned one or more domain names associated with the messaging service 700 in a domain name system (DNS). The domain name front end 702 may receive incoming connections and distribute the connections to servers providing various messaging services.

The messaging service 702 may comprise one or more chat servers 704. The chat servers 704 may comprise front-end servers for receiving and transmitting user-to-user messaging updates such as chat messages. Incoming connections may be assigned to the chat servers 704 by the domain name front end 702 based on workload balancing.

The messaging service 700 may comprise backend servers 708. The backend servers 708 may perform specialized tasks in the support of the chat operations of the front-end chat servers 704. A plurality of different types of backend servers 708 may be used. It will be appreciated that the assignment of types of tasks to different backend serves 708 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 700 may comprise one or more offline storage servers 710. The one or more offline storage servers 710 may store messaging content for currently offline messaging clients in hold for when the messaging clients reconnect.

The messaging service 700 may comprise one or more sessions servers 712. The one or more session servers 712 may maintain session state of connected messaging clients.

The messaging service 700 may comprise one or more presence servers 714. The one or more presence servers 714 may maintain presence information for the messaging service 700. Presence information may correspond to user-specific information indicating whether or not a given user has an online messaging client and is available for chatting, has an online messaging client but is currently away from it, does not have an online messaging client, and any other presence state.

The messaging service 700 may comprise one or more push storage servers 716. The one or more push storage servers 716 may cache push requests and transmit the push requests to messaging clients. Push requests may be used to wake messaging clients, to notify messaging clients that a messaging update is available, and to otherwise perform server-side-driven interactions with messaging clients.

The messaging service 700 may comprise one or more group servers 718. The one or more group servers 718 may maintain lists of groups, add users to groups, remove users from groups, and perform the reception, caching, and forwarding of group chat messages.

The messaging service 700 may comprise one or more block list servers 720. The one or more block list servers 720 may maintain user-specific block lists, the user-specific incoming-block lists indicating for each user the one or more other users that are forbidden from transmitting messages to that user. Alternatively, or additionally, the one or more block list servers 720 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 700 may comprise one or more last seen information servers 722. The one or more last seen information servers 722 may receive, store, and maintain information indicating the last seen location, status, messaging client, and other elements of a user's last seen connection to the messaging service 700.

The messaging service 700 may comprise one or more key servers 724. The one or more key servers may host public keys for public/private key encrypted communication.

The messaging service 700 may comprise one or more profile photo servers 726. The one or more profile photo servers 726 may store and make available for retrieval profile photos for the plurality of users of the messaging service 700.

The messaging service 700 may comprise one or more spam logging servers 728. The one or more spam logging servers 728 may log known and suspected spam (e.g., unwanted messages, particularly those of a promotional nature). The one or more spam logging servers 728 may be operative to analyze messages to determine whether they are spam and to perform punitive measures, in some embodiments, against suspected spammers (users that send spam messages).

The messaging service 700 may comprise one or more statistics servers 730. The one or more statistics servers may compile and store statistics information related to the operation of the messaging service 700 and the behavior of the users of the messaging service 700.

The messaging service 700 may comprise one or more web servers 732. The one or more web servers 732 may engage in hypertext transport protocol (HTTP) and hypertext transport protocol secure (HTTPS) connections with web browsers.

The messaging service 700 may comprise one or more chat activity monitoring servers 734. The one or more chat activity monitoring servers 734 may monitor the chats of users to determine unauthorized or discouraged behavior by the users of the messaging service 700. The one or more chat activity monitoring servers 734 may work in cooperation with the spam logging servers 728 and block list servers 720, with the one or more chat activity monitoring servers 734 identifying spam or other discouraged behavior and providing spam information to the spam logging servers 728 and blocking information, where appropriate to the block list servers 720.

The messaging service 700 may comprise one or more sync servers 736. The one or more sync servers 736 may sync a messaging system (e.g., systems 100, 400) with contact information from a messaging client, such as an address book on a mobile phone, to determine contacts for a user in the messaging service 700.

The messaging service 700 may comprise one or more multimedia servers 738. The one or more multimedia servers may store multimedia (e.g., images, video, audio) in transit between messaging clients, multimedia cached for offline endpoints, and may perform transcoding of multimedia.

The messaging service 700 may comprise one or more payment servers 740. The one or more payment servers 740 may process payments from users. The one or more payment servers 740 may connect to external third-party servers for the performance of payments.

The messaging service 700 may comprise one or more registration servers 742. The one or more registration servers 742 may register new users of the messaging service 700.

The messaging service 700 may comprise one or more voice relay servers 744. The one or more voice relay servers 744 may relay voice-over-Internet-protocol (VoIP) voice communication between messaging clients for the performance of VoIP calls.

Figure 8:
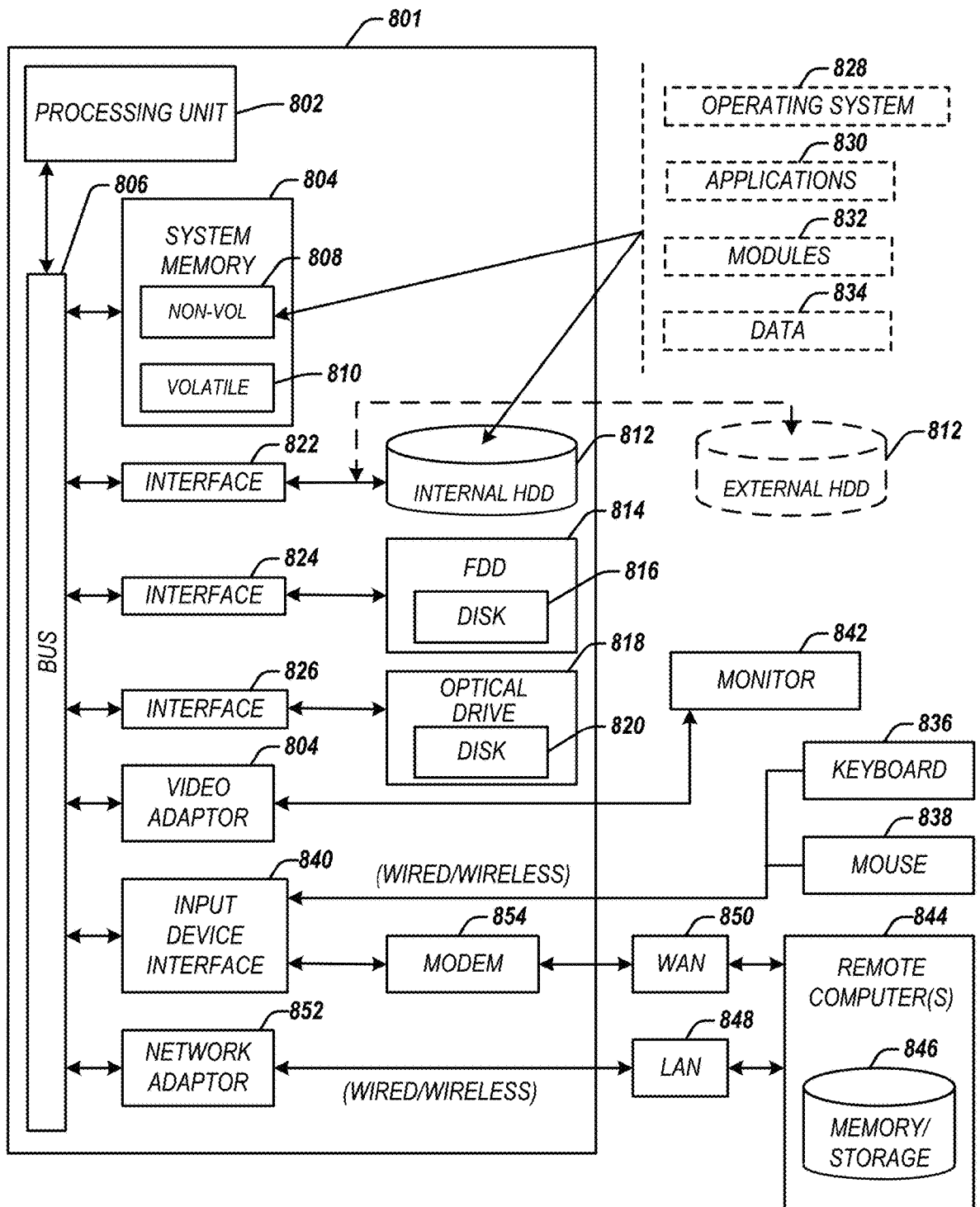
FIG. 8 is a block diagram illustrating an exemplary computing device and architecture suitable for use with exemplary embodiments.

The above-described examples, features, methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device, such as a computer 801. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 802, a system memory 804 and a system bus 806. The processing unit 802 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 802.

The system bus 806 provides an interface for system components including, but not limited to, the system memory 804 to the processing unit 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile memory 808 and/or volatile memory 810. A basic input/output system (BIOS) can be stored in the non-volatile memory 808.

The computing architecture 800 may include various types of computer-readable storage media in the form of one or more lower speed memory units, including an internal (or external) hard disk drive (HDD) 812, a magnetic floppy disk drive (FDD) 814 to read from or write to a removable magnetic disk 816, and an optical disk drive 818 to read from or write to a removable optical disk 820 (e.g., a CD-ROM or DVD). The HDD 812, FDD 814 and optical disk drive 820 can be connected to the system bus 806 by an HDD interface 822, an FDD interface 824 and an optical drive interface 826, respectively. The HDD interface 822 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 808, 812, including an operating system 828, one or more application programs 830, other program modules 832, and program data 834. In one embodiment, the one or more application programs 830, other program modules 832, and program data 834 can include, for example, the various applications and/or components of the messaging systems 100 or 400.

A user can enter commands and information into the computer 801 through one or more wire/wireless input devices, for example, a keyboard 836 and a pointing device, such as a mouse 838. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 802 through an input device interface 840 that is coupled to the system bus 806, but can be connected by other interfaces such as a parallel port, IEEE 694 serial port, a game port, a USB port, an IR interface, and so forth.

A monitor 842 or other type of display device is also connected to the system bus 806 via an interface, such as a video adaptor 844. The monitor 842 may be internal or external to the computer 801. In addition to the monitor 842, a computer typically includes other peripheral output devices, such as speakers, printers, and so forth.

The computer 801 may operate in a networked environment using logical connections via wire and/or wireless communications to one or more remote computers, such as a remote computer 844. The remote computer 844 can be a workstation, a server computer, a router, a personal computer, portable computer, microprocessor-based entertainment appliance, a peer device or other common network node, and typically includes many or all of the elements described relative to the computer 801, although, for purposes of brevity, only a memory/storage device 846 is illustrated. The logical connections depicted include wire/wireless connectivity to a local area network (LAN) 848 and/or larger networks, for example, a wide area network (WAN) 850. Such LAN and WAN networking environments are commonplace in offices and companies, and facilitate enterprise-wide computer networks, such as intranets, all of which may connect to a global communications network, for example, the Internet.

When used in a LAN networking environment, the computer 801 is connected to the LAN 848 through a wire and/or wireless communication network interface or adaptor 852. The adaptor 852 can facilitate wire and/or wireless communications to the LAN 848, which may also include a wireless access point disposed thereon for communicating with the wireless functionality of the adaptor 852.

When used in a WAN networking environment, the computer 801 can include a modem 854, or is connected to a communications server on the WAN 850, or has other means for establishing communications over the WAN 850, such as by way of the Internet. The modem 854, which can be internal or external and a wire and/or wireless device, connects to the system bus 806 via the input device interface 840. In a networked environment, program modules depicted relative to the computer 801, or portions thereof, can be stored in the remote memory/storage device 846. It will be appreciated that the network connections shown are exemplary and other means of establishing a communications link between the computers can be used.

The computer 801 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
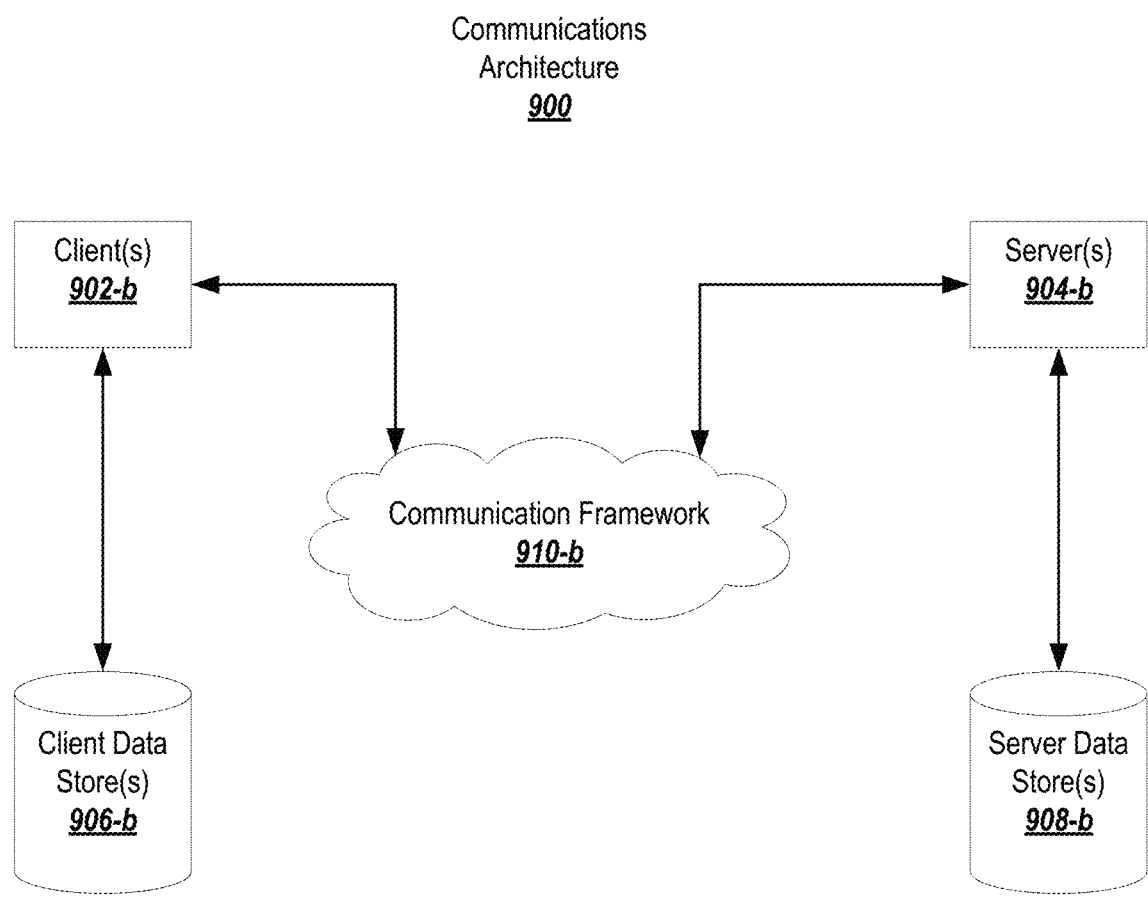
FIG. 9 depicts an exemplary communication architecture.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 includes one or more clients 902 and servers 904. The clients 902 and the servers 904 are operatively connected to one or more respective client data stores 906 and server data stores 908 that can be employed to store information local to the respective clients 902 and servers 904, such as cookies and/or associated contextual information.

The clients 902 and the servers 904 may communicate information between each other using a communication framework 910. The communications framework 910 may implement any well-known communications techniques and protocols. The communications framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 910 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
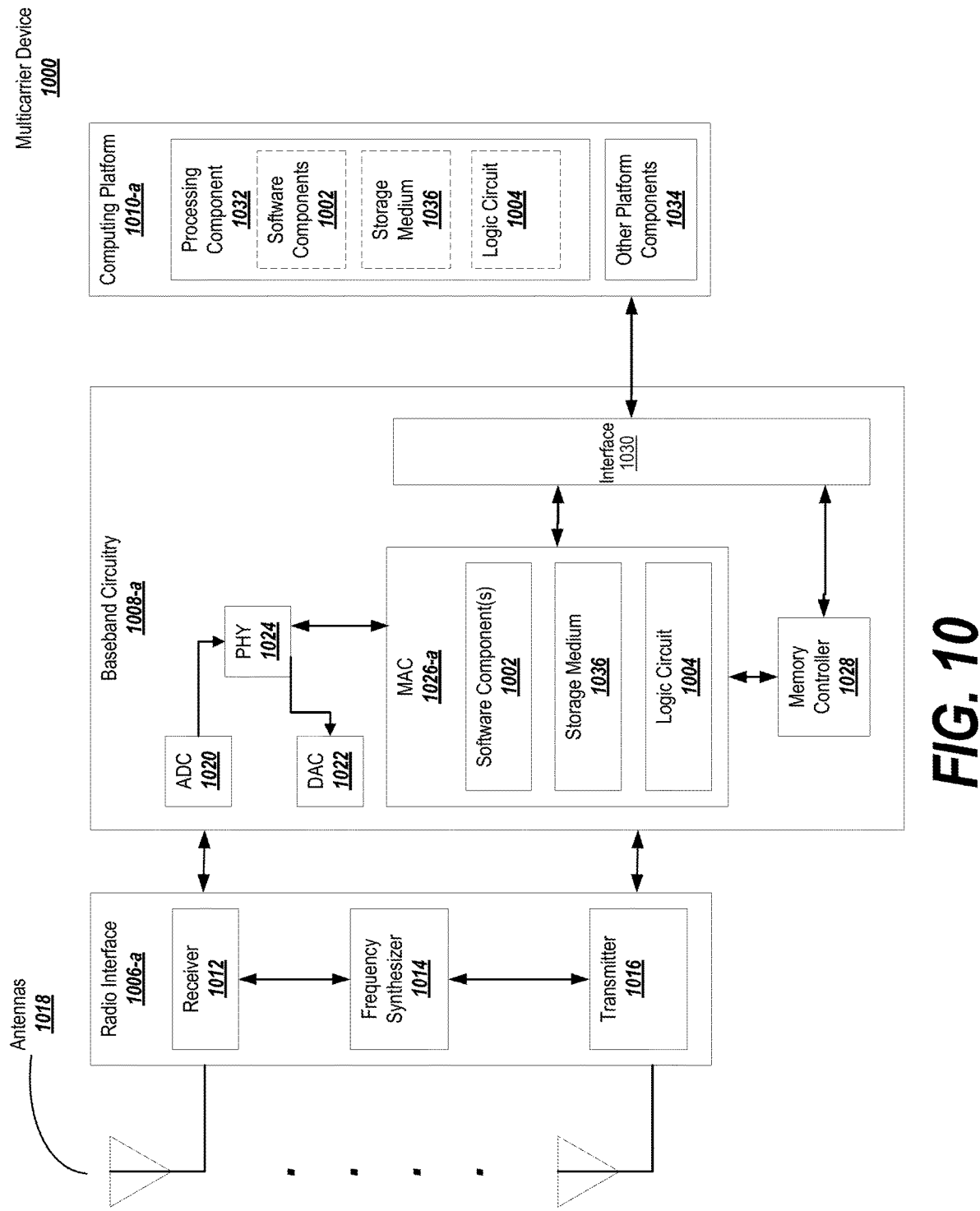
FIG. 10 is a block diagram depicting an exemplary multicarrier communications device.

FIG. 10 illustrates an embodiment of a device 1000 for use in a multicarrier OFDM system, such as the messaging systems 100 or 400. The device 1000 may implement, for example, software components 1002 as described with reference to the opt-in messaging logic or any related logic for allowing follow-up messages to be sent to client device(s) outside a messaging window without violating any existing messaging or communication policies. The device 1000 may also implement a logic circuit 1004. The logic circuit 1004 may include physical circuits to perform operations described for the messaging systems 100 or 400. As shown in FIG. 10, device 1000 may include a radio interface 1006, baseband circuitry 1008, and a computing platform 1010, although embodiments are not limited to this configuration.

The device 1000 may implement some or all of the structure and/or operations for the messaging systems 100 or 400 and/or logic circuit 1004 in a single computing entity, such as entirely within a single device. Alternatively, the device 1000 may distribute portions of the structure and/or operations for the messaging systems 100 or 400 and/or logic circuit 1004 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1006 may include a component or combination of components adapted for transmitting and/or receiving single carrier or multicarrier modulated signals (e.g., including complementary code keying (CCK) and/or orthogonal frequency division multiplexing (OFDM) symbols) although the embodiments are not limited to any specific over-the-air interface or modulation scheme. The radio interface 1006 may include, for example, a receiver 1012, a transmitter 1014 and/or a frequency synthesizer 1016. The radio interface 1006 may include bias controls, a crystal oscillator and/or one or more antennas 1018. In another embodiment, the radio interface 1006 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1008 may communicate with the radio interface 1006 to process receive and/or transmit signals and may include, for example, an analog-to-digital converter 1020 for down converting received signals, and a digital-to-analog converter 1022 for up-converting signals for transmission. Further, the baseband circuitry 1008 may include a baseband or physical layer (PHY) processing circuit 1024 for PHY link layer processing of respective receive/transmit signals. The baseband circuitry 1008 may include, for example, a processing circuit 1026 for medium access control (MAC)/data link layer processing. The baseband circuitry 1008 may include a memory controller 1028 for communicating with the processing circuit 1026 and/or a computing platform 1010, for example, via one or more interfaces 1030.

In some embodiments, the PHY processing circuit 1024 may include a frame construction and/or detection module, in combination with additional circuitry such as a buffer memory, to construct and/or deconstruct communication frames, such as radio frames. Alternatively, or in addition, the MAC processing circuit 1026 may share processing for certain of these functions or perform these processes independent of the PHY processing circuit 1024. In some embodiments, MAC and PHY processing may be integrated into a single circuit.

The computing platform 1010 may provide computing functionality for the device 1000. As shown, the computing platform 1010 may include a processing component 1032. In addition to, or alternatively of, the baseband circuitry 1008, the device 1000 may execute processing operations or logic for the messaging systems 100 or 400 and logic circuit 1004 using the processing component 1032. The processing component 1032 (and/or the PHY 1024 and/or MAC 1026) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1010 may further include other platform components 1034. Other platform components 1034 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1000 described herein, may be included or omitted in various embodiments of the device 1000, as suitably desired. In some embodiments, the device 1000 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of the device 1000 may be implemented using any combination of discrete circuitry, application specific integrated circuits (ASICs), logic gates and/or single chip architectures. Further, the features of the device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1000 shown in the block diagram of FIG. 10 may represent one functionally descriptive example of many potential implementations. Accordingly, division, omission or inclusion of block functions depicted in the accompanying Figures does not infer that the hardware components, circuits, software and/or elements for implementing these functions would be necessarily be divided, omitted, or included in embodiments.

At least one computer-readable storage medium 1036 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more exemplary embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
   memory;
   at least one processor operable to execute stored instructions to:
   receive a request from a sender to send a follow-up message from the sender to a client device;
   send an opt-in message to the client device based on the received request;
   determine whether a qualifying response to the opt-in message has been received;
   generate, based on the determination, a first token;
   receive the follow-up message from the sender with a second token;
   verify that the first and second tokens match; and
   send, based on the verification, the follow-up message to the client device, wherein the follow-up message is sent to the client device without violating any messaging policies and outside a corresponding predefined messaging time period for sending messages to the client device.

2. The apparatus of claim 1, wherein the follow-up message indicates an occurrence of a follow-up event.

3. The apparatus of claim 2, wherein the follow-up message: (i) is a one-time notification containing two or more updates on two or more topics or (ii) comprises two or more separate update messages.

4. The apparatus of claim 1, wherein the request for sending the follow-up message originates from a computing device associated with a business page, and the at least one processor is further operable to execute the stored instructions to:
- notify the business page that a user associated with the client device has properly responded to the opt-in message via a webhook; and
- send or provide the first token to the computing device associated with the business page via the webhook or in a communication separate from the webhook,
- wherein the first token expires after a predefined time period,
- wherein the business page has a predefined token count, and
- wherein the predefined token count is decremented by one when the follow-up message is sent to the client device.

5. The apparatus of claim 1, wherein the request for sending the follow-up message to the client device is based at least in part on a preconfigured template, wherein only a title and a payload associated with the template is customizable, and wherein the at least one processor is further operable to execute the stored instructions to generate the opt-in message for the client device based at least in part on the title and the payload of the template.

6. The apparatus of claim 1, wherein the determination of whether the qualifying response to the opt-in message has been received comprises stored instructions to:
- receive a response to the opt-in message from the client device;
- determine whether the response was received within a predetermined time period;
- determine whether the response explicitly includes an opt-in indication; and
- determine that the qualifying response to the opt-in message has been received based on the response being received within the predetermined time period and the response explicitly including the opt-in indication.

7. The apparatus of claim 1, wherein the at least one processor is further operable to execute the stored instructions to:
- store the first token in memory, a datastore, or a database, and
- wherein the verification of the first and second tokens matching further comprises stored instructions to:
  - determine if the first and second tokens are identical,
  - if the first and second tokens are identical, confirm a successful verification of the match, or
  - if the first and second tokens are not identical, confirm an unsuccessful verification of the match and not send the follow-up message to the client device.

8. At least one non-transitory computer-readable storage medium comprising instructions that, when executed, cause at least one processor to:
- receive a request from a sender to send a follow-up message from the sender to a client device;
- send an opt-in message to the client device based on the received request;
- determine whether a qualifying response to the opt-in message has been received;
- generate, based on the determination, a first token;
- receive the follow-up message from the sender with a second token;
- verify that the first and second tokens match; and
- send, based on the verification, the follow-up message to the client device, wherein the follow-up message is sent to the client device without violating any messaging policies and outside a corresponding predefined messaging time period for sending messages to the client device.

9. The non-transitory computer-readable storage medium of claim 8, wherein the follow-up message indicates an occurrence of a follow-up event.

10. The non-transitory computer-readable storage medium of claim 9, wherein the follow-up message: (i) is a one-time notification containing two or more updates on two or more topics, or (ii) comprises two or more separate update messages.

11. The non-transitory computer-readable storage medium of claim 8, wherein the request for sending the follow-up message originates from a computing device associated with a business page, and the instructions further cause the at least one processor to:
- notify the business page that a user associated with the client device has properly responded to the opt-in message via a webhook; and
- send or provide the first token to the computing device associated with the business page via the webhook or in a communication separate from the webhook,
- wherein the first token expires after a predefined time period,
- wherein the business page has a predefined token count, and
- wherein the predefined token count is decremented by one when the follow-up message is sent to the client device.

12. The non-transitory computer-readable storage medium of claim 8, wherein the request for sending the follow-up message to the client device is based at least in part on a preconfigured template, wherein only a title and a payload associated with the template is customizable, and wherein the instructions further cause the at least one processor to generate the opt-in message for the client device based at least in part on the title and the payload of the template.

13. The non-transitory computer-readable storage medium of claim 8, wherein the determination of whether the qualifying response to the opt-in message has been received comprises instructions that further cause the at least one processor to:
- receive a response to the opt-in message from the client device;
- determine whether the response was received within a predetermined time period;
- determine whether the response explicitly includes an opt-in indication; and
- determine that the qualifying response to the opt-in message has been received based on the response being received within the predetermined time period and the response explicitly including the opt-in indication.

14. The non-transitory computer-readable storage medium of claim 8, wherein the instructions further cause the at least one processor to:
- store the first token in memory, a datastore, or a database, and
- wherein the verification of the first and second tokens matching comprises the instructions to further cause the at least one processor to:
  - determine if the first and second tokens are identical,
  - if the first and second tokens are identical, confirm a successful verification of the match, or if the first and second tokens are not identical, confirm an unsuccessful verification of the match and not send the follow-up message to the client device.

15. A method comprising:
receiving a request from a sender to send a follow-up message from the sender to a client device;
sending an opt-in message to the client device based on the received request;
determining whether a qualifying response to the opt-in message has been received;
generating, based on the determining, a first token;
receiving the follow-up message from the sender with a second token;
verifying that the first and second tokens match; and
sending, based on the verifying, the follow-up message to the client device, wherein the follow-up message is sent to the client device without violating any messaging policies and outside a corresponding predefined messaging time period for sending messages to the client device.

16. The method of claim 15, wherein the follow-up message indicates an occurrence of a follow-up event, and wherein the follow-up message: (i) is a one-time notification containing two or more updates on two or more topics or (ii) comprises two or more separate update messages.

17. The method of claim 15, wherein the request for sending the follow-up message originates from a computing device associated with a business page, and the method further comprising:
notifying, via the one or more processors, the business page that a user associated with the client device has properly responded to the opt-in message via a webhook; and
sending or providing the first token to the computing device associated with the business page via the webhook or in a communication separate from the webhook,
wherein the first token expires after a predefined time period,
wherein the business page has a predefined token count, and
wherein the predefined token count is decremented by one when the follow-up message is sent to the client device.

18. The method of claim 15, wherein the request for sending the follow-up message to the client device is based at least in part on a preconfigured template, wherein only a title and a payload associated with the template is customizable, and the method further comprising generating the opt-in message for the client device based at least in part on the title and the payload of the template.

19. The method of claim 15, wherein the determining of whether the qualifying response to the opt-in message has been received further comprises:
receiving a response to the opt-in message from the client device;
determining whether the response was received within a predetermined time period;
determining whether the response explicitly includes an opt-in indication; and
determining that the qualifying response to the opt-in message has been received based on the response being received within the predetermined time period and the response explicitly including the opt-in indication.

20. The method of claim 15, further comprising:
storing the first token in memory, a datastore, or a database, and
wherein the verifying of the first and second tokens matching further comprises:
determining if the first and second tokens are identical,
if the first and second tokens are identical, confirming a successful verification of the match, or
if the first and second tokens are not identical, confirming an unsuccessful verification of the match and not sending the follow-up message to the client device.

* * * * *